US008327287B2

(12) United States Patent
Kuroume et al.

(10) Patent No.: US 8,327,287 B2
(45) Date of Patent: Dec. 4, 2012

(54) CHARACTER INPUT PROGRAM AND CHARACTER INPUT DEVICE

(75) Inventors: Tomoaki Kuroume, Kyoto (JP); Shinji Okane, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1397 days.

(21) Appl. No.: 11/591,467

(22) Filed: Nov. 2, 2006

(65) Prior Publication Data

US 2007/0242041 A1 Oct. 18, 2007

(30) Foreign Application Priority Data

Apr. 12, 2006 (JP) .................................. 2006-109936

(51) Int. Cl.
G06F 3/048 (2006.01)

(52) U.S. Cl. ........................................ 715/780; 345/157

(58) Field of Classification Search .................. 715/780; 345/158, 165, 157
See application file for complete search history.

(56) References Cited

U.S. PATENT DOCUMENTS

| 5,045,843 | A | * | 9/1991 | Hansen | 345/158 |
| 5,574,479 | A | * | 11/1996 | Odell | 345/158 |
| 5,793,353 | A | * | 8/1998 | Wu | 345/156 |
| 5,953,541 | A | * | 9/1999 | King et al. | 710/67 |
| 5,956,021 | A | | 9/1999 | Kubota et al. | |
| 6,016,142 | A | * | 1/2000 | Chang et al. | 715/763 |
| 6,146,278 | A | * | 11/2000 | Kobayashi | 463/53 |
| 6,184,863 | B1 | * | 2/2001 | Sibert et al. | 345/156 |
| 6,188,388 | B1 | * | 2/2001 | Arita et al. | 345/158 |
| 6,295,052 | B1 | * | 9/2001 | Kato et al. | 345/179 |
| 6,404,416 | B1 | * | 6/2002 | Kahn et al. | 345/158 |
| 6,486,870 | B1 | * | 11/2002 | Kozu | 345/157 |
| 6,487,424 | B1 | * | 11/2002 | Kraft et al. | 455/566 |
| 6,727,885 | B1 | * | 4/2004 | Ishino et al. | 345/156 |
| 7,003,328 | B2 | * | 2/2006 | Kuwazoe | 455/566 |
| 7,168,046 | B2 | * | 1/2007 | Kang et al. | 715/773 |
| 7,232,986 | B2 | * | 6/2007 | Worthington et al. | 250/221 |
| 7,581,180 | B2 | * | 8/2009 | Masui et al. | 715/259 |
| 7,761,175 | B2 | * | 7/2010 | Gutowitz et al. | 700/84 |
| 7,908,553 | B2 | * | 3/2011 | Kimura et al. | 715/703 |

(Continued)

FOREIGN PATENT DOCUMENTS

JP 7-78045 3/1995

(Continued)

OTHER PUBLICATIONS

Japanese Office Action issued on Dec. 28, 2010 in JP 2006-109936.

Primary Examiner — Phenuel Salomon
(74) Attorney, Agent, or Firm — Nixon & Vanderhye P.C.

(57) ABSTRACT

A plurality of character input key images are displayed on the screen. One character is displayed on the screen as an undetermined character in a cyclic order from among a group of characters associated with one of the character input key images each time a button provided on the pointing device is operated while the character input key image is being pointed at by a pointing device. When the position pointed at by the pointing device moves out of the character input key image associated with the undetermined character being displayed on the screen, the undetermined character is displayed as a determined character on the screen. Thus, it is possible to suppress the lowering of the character input speed and the possibility of erroneous inputs while reducing the total number of keys required for inputting characters.

37 Claims, 23 Drawing Sheets

U.S. PATENT DOCUMENTS

| | | | |
|---|---|---|---|
| 2001/0014440 A1* | 8/2001 | Oyama et al. | 434/227 |
| 2002/0054135 A1* | 5/2002 | Noguchi et al. | 345/788 |
| 2003/0095104 A1* | 5/2003 | Kandogan et al. | 345/168 |
| 2004/0046736 A1* | 3/2004 | Pryor et al. | 345/156 |
| 2004/0066415 A1* | 4/2004 | Khoo et al. | 345/792 |
| 2005/0210402 A1* | 9/2005 | Gunn et al. | 715/773 |
| 2006/0152487 A1* | 7/2006 | Grunnet-Jepsen et al. | 345/158 |

FOREIGN PATENT DOCUMENTS

| | | |
|---|---|---|
| JP | H09-081320 | 3/1997 |
| JP | H10-228349 | 8/1998 |
| JP | 2000-268200 | 9/2000 |
| JP | 2000-330704 | 11/2000 |
| JP | 2002-055767 | 2/2002 |
| JP | 2003-256115 | 9/2003 |

* cited by examiner

F I G. 4
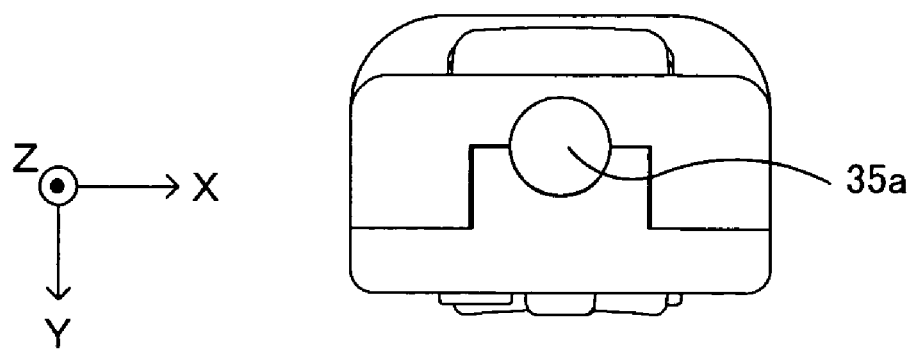

FIG. 12

| CHARACTER ASSIGNMENT INFORMATION 53 ||
|---|---|
| CHARACTER INPUT KEY | ASSIGNED CHARACTERS |
| 「あ」 | あ→い→う→え→お |
| 「か」 | か→き→く→け→こ |
| 「さ」 | さ→し→す→せ→そ |
| 「た」 | た→ち→つ→て→と |
| 「な」 | な→に→ぬ→ね→の |
| 「は」 | は→ひ→ふ→へ→ほ |
| 「ま」 | ま→み→む→め→も |
| 「や」 | や→ゆ→よ |
| 「ら」 | ら→り→る→れ→ろ |
| 「わ」 | わ→を→ん |
| 「*」 | *→+→-→<→> |
| 「#」 | #→!→$→%→& |

CHARACTER ASSIGNMENT INFORMATION 53

| CHARACTER INPUT KEY | ASSIGNED CHARACTERS |
|---|---|
| 「ABC」 | A→B→C |
| 「DEF」 | D→E→F |
| 「GHI」 | G→H→I |
| 「JKL」 | J→K→L |
| 「MNO」 | M→N→O |
| 「PQRS」 | P→Q→R→S |
| 「TUV」 | T→U→V |
| 「WXYZ」 | W→X→Y→Z |
| 「*」 | *→+→−→<→> |
| 「#」 | #→!→$→%→& |

F I G. 2 1
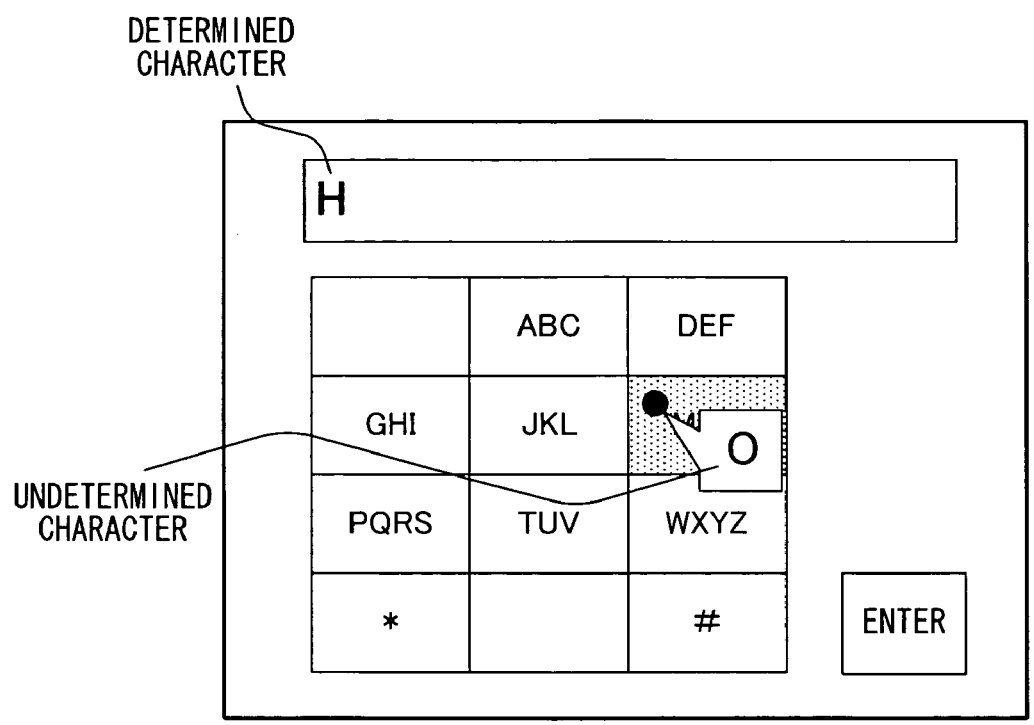

CHARACTER INPUT PROGRAM AND CHARACTER INPUT DEVICE

CROSS REFERENCE TO RELATED APPLICATION

The disclosure of Japanese Patent Application No. 2006-109936, filed on Apr. 12, 2006, is incorporated herein by reference.

FIELD

The technology herein relates to a character input program and a character input device and, more particularly, to a character input program and a character input device for inputting characters by using a pointing device having at least one button.

BACKGROUND AND SUMMARY

With a Japanese input device disclosed in Japanese Laid-Open Patent Publication No. 7-78045 (hereinafter "Patent Document 1"), each time the user presses one of a plurality of consonant keys provided in a control section, a character is displayed as a candidate (or "undetermined") character on the screen of a display device in a cyclic order from among a group of characters assigned to the consonant key. When an intended character is being displayed, the user can press a preliminary determination key or a different consonant key to thereby turn the candidate character into a "determined" character. As used herein, an "undetermined character" is a character displayed as a candidate, which is to be selected or not selected by the user as an intended input character, whereas a "determined character" is a character that has been selected, or finalized, by the user as being an intended input character. By assigning a group of characters to one key, it is possible to reduce the total number of keys needed, thereby simplifying and downsizing the input device.

However, with the Japanese input device of Patent Document 1, the user needs to press the preliminary determination key when inputting two characters in a row that are assigned to the same consonant key. This requires the user to move the finger between the consonant key and the preliminary determination key, thus slowing down the character input speed and increasing the possibility of erroneous inputs. As the distance between the consonant key and the preliminary determination key is greater, the character input speed becomes slower and erroneous inputs become more likely.

The technique disclosed in Patent Document 1 may be applicable to a character input method using a pointing device. In a character input method using a pointing device, the user inputs a character by pointing at a key image displayed on the screen with the pointing device. Unlike when inputting characters using a keyboard, the user cannot know the positions of the keys based on the tactile sensation, but the user needs to point at a key image with the pointing device based solely on the visual sensation. Thus, as compared with a case where the user inputs characters by using a keyboard, the character input speed is likely to be slower and erroneous inputs are more likely. Therefore, the problems related to the character input speed and erroneous inputs are more pronounced than in a case where a keyboard is used.

Therefore, certain non-limiting illustrative embodiments provide a character input program and a character input device, with which it is possible to suppress the lowering of the character input speed and the possibility of erroneous inputs while reducing the total number of keys required for inputting characters.

Non-limiting illustrative embodiments may have the following features. Note that reference numerals and figure numbers are shown in parentheses below for assisting the reader in finding corresponding components in the drawings to facilitate the understanding of the non-limiting illustrative embodiments. It is understood that these parenthetic expressions are not limiting in any way.

A first aspect of the non-limiting illustrative embodiments is directed to a computer-readable storage medium, storing a character input program for inputting characters by using a pointing device (7) having at least one button (32i). The character input program instructs a computer (10) to function as character input key image display control means, pointed position detection means, button operation detection means, undetermined character display control means, and determined character display control means. The character input key image display control means is means for displaying, on a screen of a display device (2), a character input key image associated with a group of characters. The pointed position detection means is means for detecting, based on a signal from the pointing device, a position on the screen being pointed at by the pointing device (S10). The button operation detection means is means for detecting whether or not the button is operated (S22). The undetermined character display control means is means for displaying one character on the screen as an undetermined character in a cyclic order from among the group of characters associated with the character input key image each time the operation of the button is detected by the button operation detection means while the pointed position detection means is detecting that the character input key image is being pointed at by the pointing device (S28, S30). The determined character display control means is means for displaying the undetermined character as a determined character on the screen when the position pointed at by the pointing device as detected by the pointed position detection means moves out of the character input key image associated with the undetermined character displayed on the screen (S44).

In one non-limiting illustrative embodiment, the character input key image display control means displays a plurality of character input key images on the screen.

In one non-limiting illustrative embodiment, the undetermined character display control means displays the undetermined character at a position following a determined character string being displayed on the screen by the determined character display control means (FIG. 10E, FIG. 18C). Since an undetermined character is displayed at a position following the determined character string, the user can easily know what the determined character string will be after the undetermined character is turned into a determined character, whereby the possibility of erroneous inputs can be reduced.

In one non-limiting illustrative embodiment, the undetermined character display control means displays the undetermined character on the character input key image being pointed at by the pointing device (FIG. 16A). Thus, the undetermined character is displayed near the pointed position, whereby the user no longer needs to move the eyes substantially away from the pointed position in order to check the undetermined character, thus improving the controllability.

In one non-limiting illustrative embodiment, the group of characters associated with the character input key image are displayed on the character input key image, and the undetermined character display control means highlights, as the undetermined character, one of the group of characters on the character input key image being pointed at by the pointing device (FIG. 20A). Thus, the undetermined character is displayed near the pointed position, whereby the user no longer needs to move the eyes substantially away from the pointed position in order to check the undetermined character, thus improving the controllability. An undetermined character can be highlighted by, for example, changing at least one of the size, color, shape and position of the character.

In one non-limiting illustrative embodiment, the undetermined character display control means displays the undetermined character near the position pointed at by the pointing device so that the undetermined character moves together with the pointed position. Thus, the undetermined character is displayed near the pointed position, whereby the user no longer needs to move the eyes substantially away from the pointed position in order to check the undetermined character, thus improving the controllability.

In one non-limiting illustrative embodiment, the character input program instructs the computer to further function as undetermined character sound notification means for notifying a user of an undetermined character being displayed on the screen via a sound. Thus, the user can audibly check the undetermined character, whereby the user no longer needs to move the eyes substantially away from the pointed position in order to check the undetermined character, thus improving the controllability.

In one non-limiting illustrative embodiment, the character input program instructs the computer to further function as determination notification means for notifying a user that the undetermined character displayed on the screen by the undetermined character display control means has turned into a determined character after the position pointed at by the pointing device moves out of the character input key image associated with the undetermined character being displayed on the screen. Then, a new user can intuitively learn the character input method of the present invention, where an undetermined character is turned into a determined character when the pointed position moves out of the character input key image associated with the undetermined character.

In one non-limiting illustrative embodiment, the determination notification means includes animation means for, when the position pointed at by the pointing device moves out of the character input key image associated with the undetermined character being displayed on the screen, providing an animation of the undetermined character moving to a position following a determined character string being displayed on the screen by the determined character display control means. Then, it is possible to guide the user's eyes to the end of the determined character string, thereby intuitively notifying the user that the character, which was displayed as an undetermined character, has now been added to the determined character string. Moreover, since the user can confirm, by means of an animation, that the undetermined character has turned into a determined character, the user no longer needs to actually look at the determined character string, thus improving the controllability.

In one non-limiting illustrative embodiment, the determination notification means includes sound effect output means for, when the position pointed at by the pointing device moves out of the character input key image associated with the undetermined character being displayed on the screen, playing a predetermined sound effect. Then, since the user can confirm, by means of a sound effect, that the undetermined character has turned into a determined character, the user no longer needs to actually look at the determined character string, thus improving the controllability.

In one non-limiting illustrative embodiment, each character input key image is assigned a group of kana characters from one column in a Japanese syllabary.

In one non-limiting illustrative embodiment, each character input key image is assigned a group of English alphabet characters.

In one non-limiting illustrative embodiment, each character input key image is assigned a group of words.

In one non-limiting illustrative embodiment, each character input key image is assigned a group of symbols.

A second aspect of the non-limiting illustrative embodiments is directed to a computer-readable storage medium, storing a character input program for a computer (10) of an information processing device having a function of calculating a position on a screen of a display device (2) being pointed at by a pointing device (7), the pointing device including an image sensing device (35) for capturing an image of at least two markers (8a, 8b) provided around the screen of the display device and a control button (32i), and the calculation being carried out based on information representing a positional relationship of the markers with respect to the captured image (A1) received from the pointing device, wherein the character input program instructs the computer to function as character input key image display means, button operation detection means, undetermined character display control means, and determined character display control means. The character input key image display means is means for displaying, on the screen of the display device, a character input key image associated with a group of characters. The button operation detection means is means for detecting whether or not the button is operated (S22). The undetermined character display control means is means for displaying one character on the screen as an undetermined character in a cyclic order from among the group of characters associated with the character input key image, which is being overlapped by the pointed position, each time the operation of the button is detected by the button operation detection means while the pointed position is overlapping the character input key image (S28, S30). The determined character display control means is means for displaying the undetermined character as a determined character on the screen when the pointed position moves out of the character input key image associated with the undetermined character (S44).

A third aspect of the non-limiting illustrative embodiments is directed to a character input device, including: at least two markers (8a, 8b) provided around a screen of a display device (2); a pointing device (7) including an image sensing device (35) for capturing an image of the markers and a control button (32i); calculation means (10) for calculating a pointed position on the screen based on a positional relationship of the markers with respect to the captured image (A1) obtained from the image sensing device; character input key image display control means (10) for displaying, on the display device, a character input key image associated with a group of characters; button operation detection means (10, S22) for detecting whether or not the button is operated; undetermined character display control means (10, S28, S30) for displaying one character on the screen as an undetermined character in a cyclic order from among the group of characters associated with the character input key image, which is being overlapped by the pointed position, each time the operation of the button is detected by the button operation detection means while the pointed position is overlapping the character input key image; and determined character display control means (10, S44) for displaying the undetermined character as a determined character on the screen when the pointed position moves out of the character input key image associated with the undetermined character.

A non-limiting illustrative embodiment may be applied when two or more characters assigned to the same character input key image are inputted in a row because an undetermined character can be easily and quickly turned into a determined character simply by moving the position pointed at by the pointing device out of the character input key image. Thus, it is possible to suppress the lowering of the character input speed and the possibility of erroneous inputs.

These and other features, aspects and advantages of the A non-limiting illustrative embodiments will become more apparent from the following detailed description of the non-limiting illustrative embodiments when taken in conjunction with the accompanying drawings.

BRIEF DESCRIPTION OF THE DRAWINGS

FIG. 4 shows the controller 7 as viewed from the front side;

FIG. 12 shows a specific example of character assignment information 53;

FIG. 21 shows an exemplary screen of the monitor 2 during a character input operation.

DESCRIPTION OF THE PREFERRED EMBODIMENTS

Figure 1:
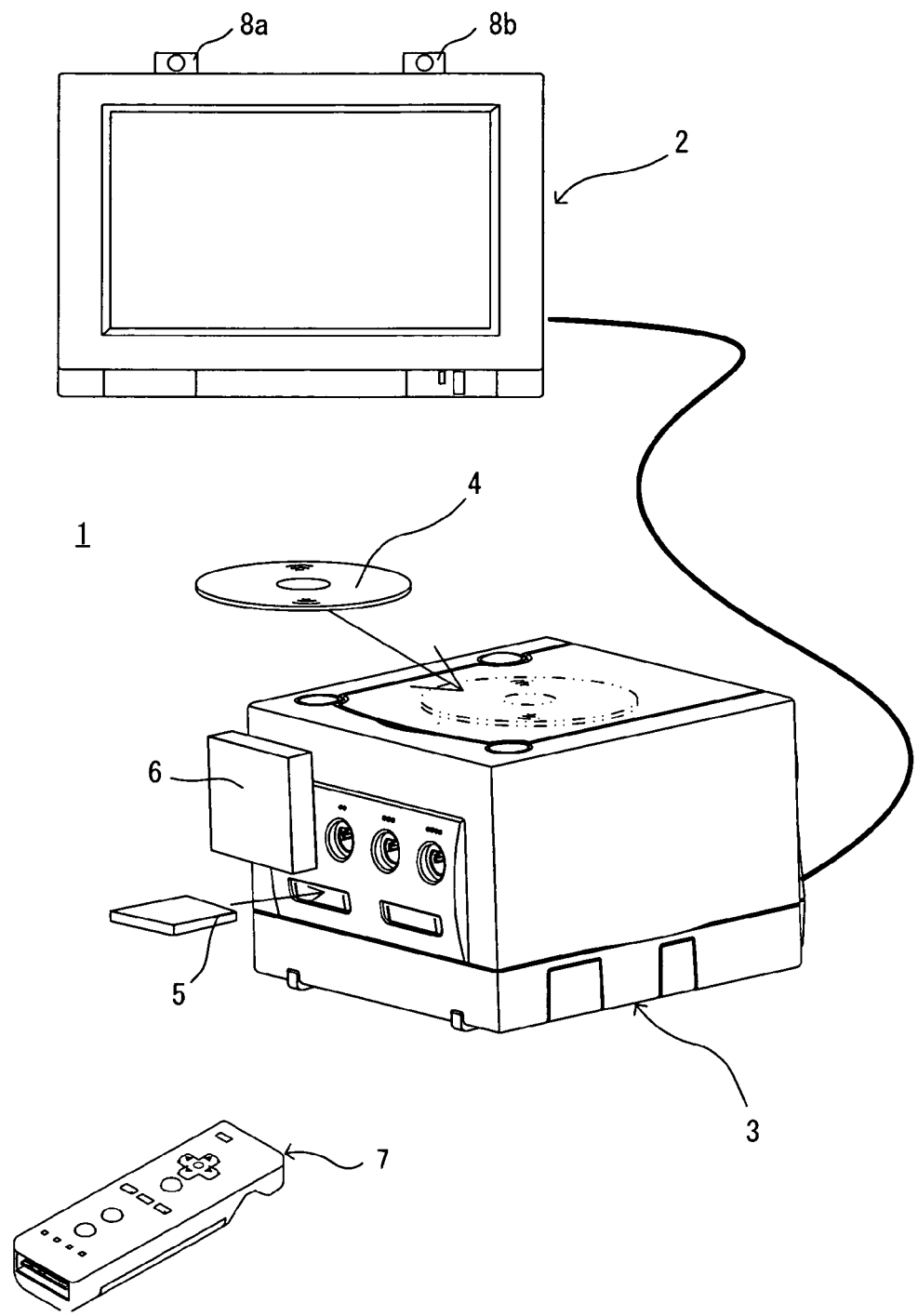
FIG. 1 is an external view showing a video game system including a video game device, being an example of a position calculation device according to an non-limiting illustrative embodiment.

Referring to FIG. 1, a video game system 1 according to one embodiment will now be described. The present invention is not limited to video game systems, and is applicable to any types of information processing systems.

FIG. 1 is an external view showing the video game system 1. Referring to FIG. 1, the video game system 1 includes a home-console type video game device (hereinafter simply "video game device") 3 and a controller 7 for giving control information to the video game device 3. The video game device 3 is connected, via a connection cord, to a display (hereinafter "monitor") 2 provided with a speaker, such as a home television receiver. Two markers 8a and 8b are provided around the monitor 2 (on the upper side of the screen in the illustrated example). Specifically, the markers 8a and 8b are infrared LEDs outputting infrared light to the front side of the monitor 2. A receiver unit 6 is connected to the video game device 3 via a connection terminal. The receiver unit 6 receives control data wirelessly transmitted from the controller 7, and the controller 7 and the video game device 3 are connected via wireless communications. The video game system 1 includes an optical disc 4, being an example of an information storage medium that can be received by the video game device 3. Provided on the upper principal plane of the video game device 3 are an ON/OFF switch for turning ON/OFF the power of the video game device 3, a reset switch for resetting a game process, and an OPEN switch for opening the upper lid of the video game device 3. The lid opens up when the OPEN switch is pressed by the player so that the optical disc 4 can be put in place.

The video game device 3 can also receive an external memory card 5 including a backup memory, or the like, for statically storing save data, or the like. The video game device 3 executes a video game program, or the like, stored in the optical disc 4 to obtain a game image, and displays the obtained game image on the monitor 2. The video game device 3 may reproduce a past game status from save data stored in the external memory card 5 to obtain a game image for that past game status, and display the obtained game image on the monitor 2. Then, the player of the video game device 3 can enjoy the game process by operating the controller 7 while watching the game image displayed on the monitor 2.

The controller 7 wirelessly transmits, from a communications section 36 (FIG. 6) therein, the control data to the video game device 3, to which the receiver unit 6 is connected, by means of a technique such as Bluetooth (registered trademark), for example. The controller 7 has a control section, including a plurality of control buttons. The controller 7 includes an image capturing/processing section 35 (FIG. 6) for capturing an image as viewed from the controller 7. Specifically, the image capturing/processing section 35 takes an image of the markers 8a and 8b provided around the monitor 2. As will be described later, it is possible to detect the position and orientation of the controller 7 based on the position of the marker 8a and/or that of the marker 8b included in the image.

Figure 2:
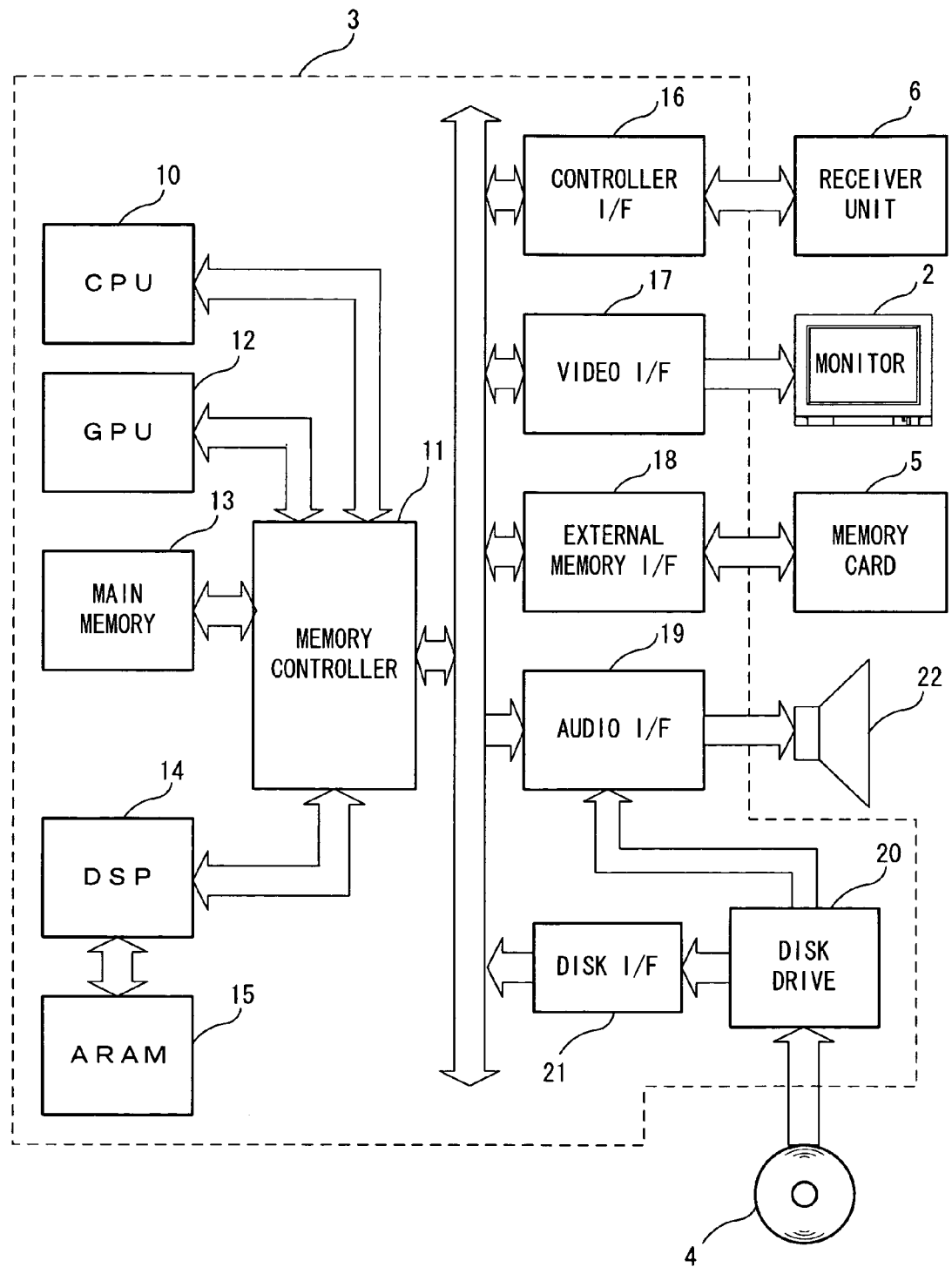
FIG. 2 is a functional block diagram showing a video game device 3.

Referring now to FIG. 2, a configuration of the video game device 3 will be described. FIG. 2 is a functional block diagram showing the video game device 3.

Referring to FIG. 2, the video game device 3 includes a RISC CPU (Central Processing Unit) 10, for example, for executing various computer programs. The CPU 10 executes a boot program stored in a boot ROM (not shown), thus initializing memory devices, such as a main memory 13, and then executes a video game program stored in the optical disc 4 to perform a game process, etc., according to the video game program. Connected to the CPU 10 via a memory controller 11 are a GPU (Graphics Processing Unit) 12, the main memory 13, a DSP (Digital Signal Processor) 14, and an ARAM (Audio RAM) 15. The memory controller 11 is connected, via a predetermined bus, to a controller I/F (interface) 16, a video I/F 17, an external memory I/F 18, an audio I/F 19 and a disk I/F 21, which are connected to the receiver unit 6, the monitor 2, the external memory card 5, the speaker 22 and a disk drive 20, respectively.

The GPU 12 is responsible for image processing based on instructions from the CPU 10, and is a semiconductor chip, for example, capable of computations necessary for 3D graphics display. The GPU 12 performs the image process by using a memory dedicated for image processing (not shown) or a part of the memory area of the main memory 13. The GPU 12 produces game image data or movie data to be displayed on the monitor 2 using these memory areas, and outputs the produced data to the monitor 2 via the memory controller 11 and the video I/F 17 as necessary.

The main memory 13 is a memory area used by the CPU 10, and stores a video game program, etc., as necessary for processes performed by the CPU 10. For example, the main memory 13 stores the video game program loaded from the optical disc 4 by the CPU 10 and various data, etc. The video game program, the various data, etc., stored in the main memory 13 are executed or processed by the CPU 10.

The DSP 14 is for processing sound data, etc., produced by the CPU 10 when executing the video game program, and is connected to the ARAM 15 for storing the sound data, etc. The ARAM 15 is used when the DSP 14 performs a predetermined process (e.g., storing a video game program, sound data, etc., which have been loaded in advance). The DSP 14 reads out the sound data stored in the ARAM 15, and outputs the sound data through the speaker 22 provided in the monitor 2 via the memory controller 11 and the audio I/F 19.

The memory controller 11 is responsible for the overall control of data transfers, and is connected to the various I/F's described above. The controller I/F 16 includes, for example, four controller I/F portions, each having a connector into which an external unit can be fitted for communicable connection between the external unit and the video game device 3. For example, the receiver unit 6 may be fitted into the connector to be connected to the video game device 3 via the controller I/F 16. As described above, the receiver unit 6 receives control data from the controller 7, and outputs the control data to the CPU 10 via the controller I/F 16. In other embodiments, the video game device 3 may include therein, instead of the receiver unit 6, a receiver module for receiving control data transmitted from the controller 7. In such a case, the transmitted data received by the receiver module is outputted to the CPU 10 via a predetermined bus. The monitor 2 is connected to the video I/F 17. The external memory card 5 is connected to the external memory I/F 18, whereby a backup memory, etc., provided in the external memory card 5 can be accessed. The audio I/F 19 is connected to the speaker 22 provided in the monitor 2 so that the sound data read out from the ARAM 15 by the DSP 14 or the sound data outputted directly from the disk drive 20 can be outputted through the speaker 22. The disk I/F 21 is connected to the disk drive 20. The disk drive 20 reads out data from the optical disc 4 placed in a predetermined read-out position, and outputs the data to the bus or the audio I/F 19 of the video game device 3.

Figure 3A:
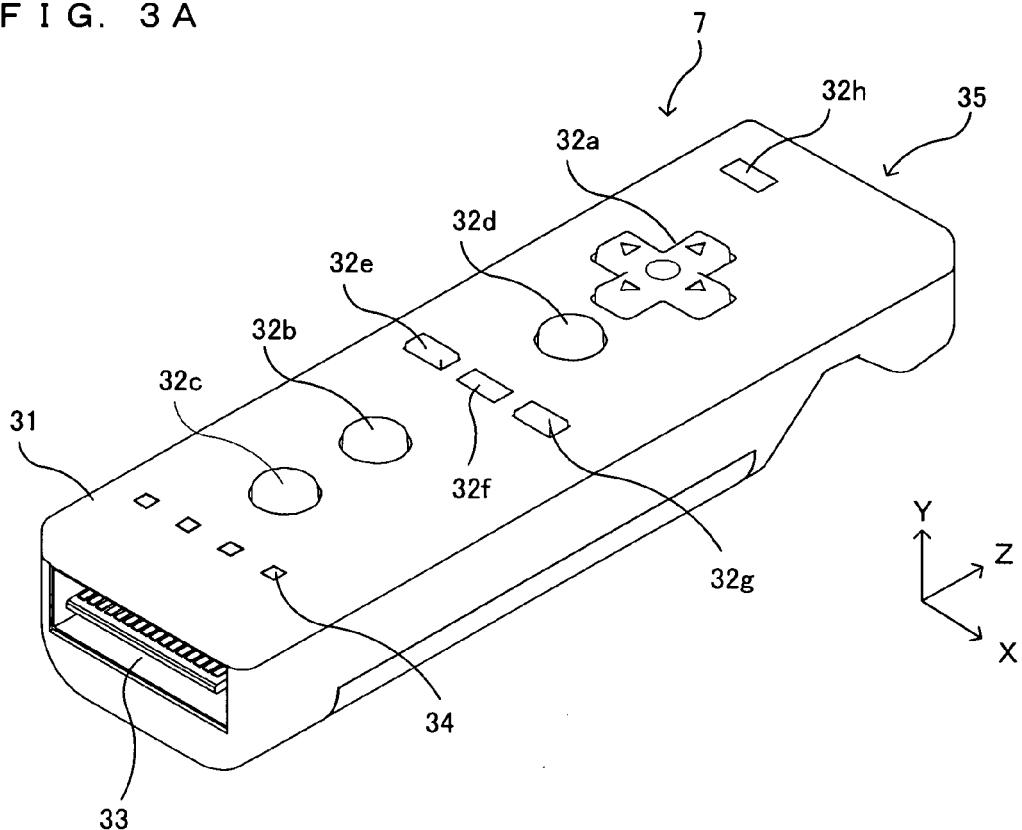
FIG. 3A is a perspective view showing a controller 7.

Referring now to FIGS. 3A to 7, the controller 7 will be described. FIGS. 3A to 5B are perspective views showing the external structure of the controller 7. FIG. 3A is a perspective view showing the controller 7 as viewed from the upper rear side, and FIG. 3B is a perspective view showing the controller 7 as viewed from the lower rear side. FIG. 4 shows the controller 7 as viewed from the front side.

Figure 3B:
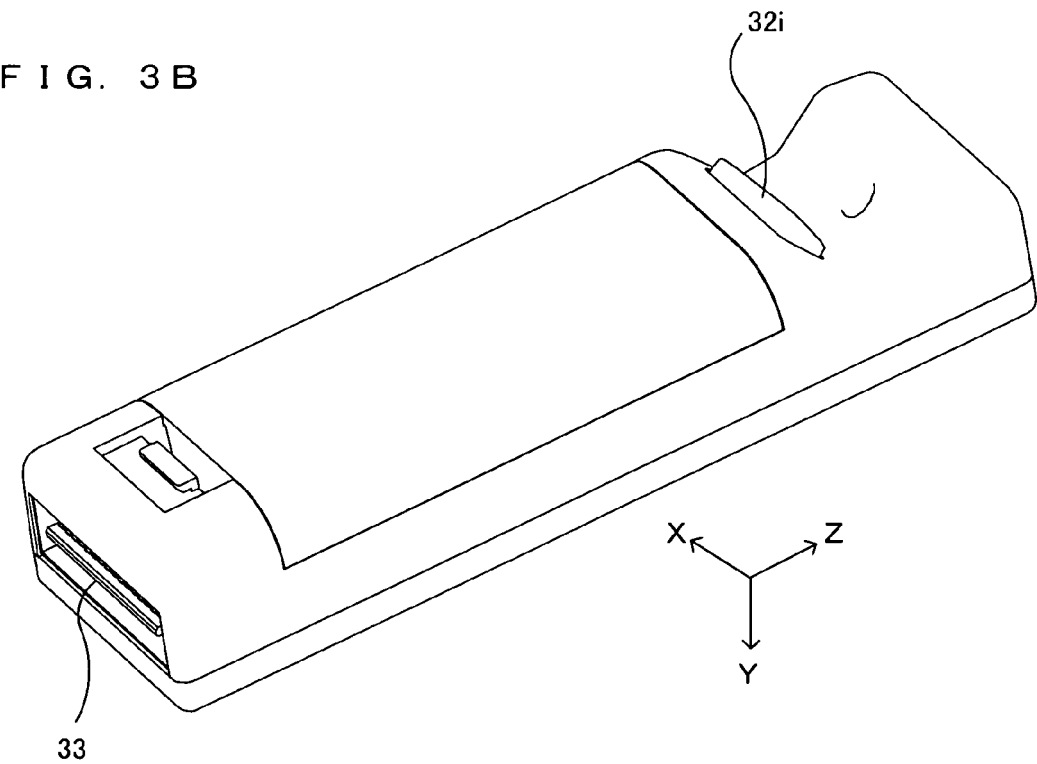
FIG. 3B is a perspective view showing the controller 7.

The controller 7 shown in FIGS. 3A, 3B and 4 includes a housing 31 formed by molding a plastic material, for example. The housing 31 has a generally rectangular parallelepiped shape, with the longitudinal direction being the front-rear direction (the Z-axis direction shown in FIG. 3A), and has an overall size such that it can be held in a hand of an adult or a child. The player can change the position on the screen pointed at by the controller 7 by changing the position or the direction of the controller 7. As used herein, "the position on the screen pointed at by the controller 7" is ideally the position at which the straight line extending in the longitudinal direction from the front end of the controller 7 crosses the screen of the monitor 2. However, it does not have to be precisely the position as long as a position in the vicinity thereof can be calculated by the video game device 3. Hereinafter, the position on the screen pointed at by the controller 7 will be referred to as the "pointed position". Moreover, the longitudinal direction of the controller 7 (the housing 31) in the present embodiment may hereinafter be referred to as the "pointing direction of the controller 7".

The housing 31 includes a plurality of control buttons. Provided on the upper surface of the housing 31 are a cross-shaped key 32a, an X button 32b, a Y button 32c, a B button 32d, a select switch 32e, a menu switch 32f and a start switch 32g. A depressed portion is formed on the lower surface of the housing 31, and an A button 32i is provided on a slope on the rear side of the depressed portion. Each of these buttons (switches) is assigned a function as specified in the video game program executed by the video game device 3. A power switch 32h for turning ON/OFF the power of the video game device 3 from a remote position is provided on the upper surface of the housing 31.

Moreover, the controller 7 includes the image capturing/processing section 35 (FIG. 5B), and a light receiving port 35a of the image capturing/processing section 35 is provided on the front side of the housing 31 as shown in FIG. 4. A connector 33 is provided on the rear side of the housing 31. The connector 33 is, for example, a 32-pin edge connector, and may be used for connecting other units to the controller 7. Moreover, a plurality of LEDs 34 are provided on the upper surface of the housing 31 near the rear end. The controller 7 is given a controller ID (number) for identifying the controller 7 from others. The LEDs 34 are used for notifying the player of the controller ID being currently assigned to the controller 7. Specifically, when control data is transmitted from the controller 7 to the video game device 3, one of the LEDs 34 is lit depending on the controller ID.

Figure 5A:
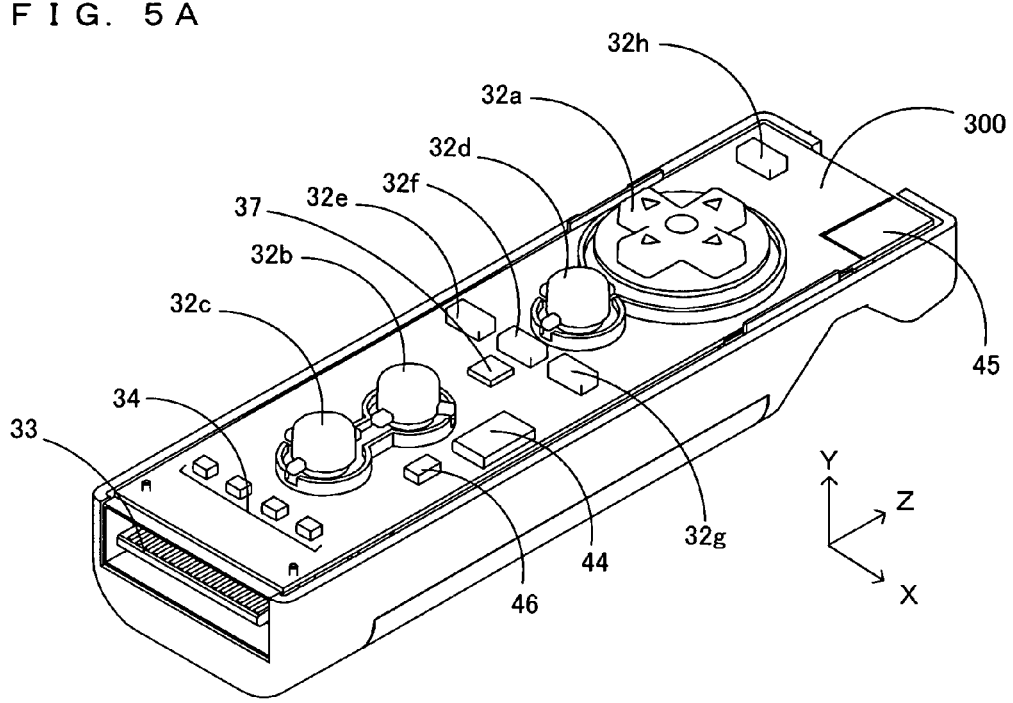
FIG. 5A shows an internal configuration of the controller 7.
Figure 5B:
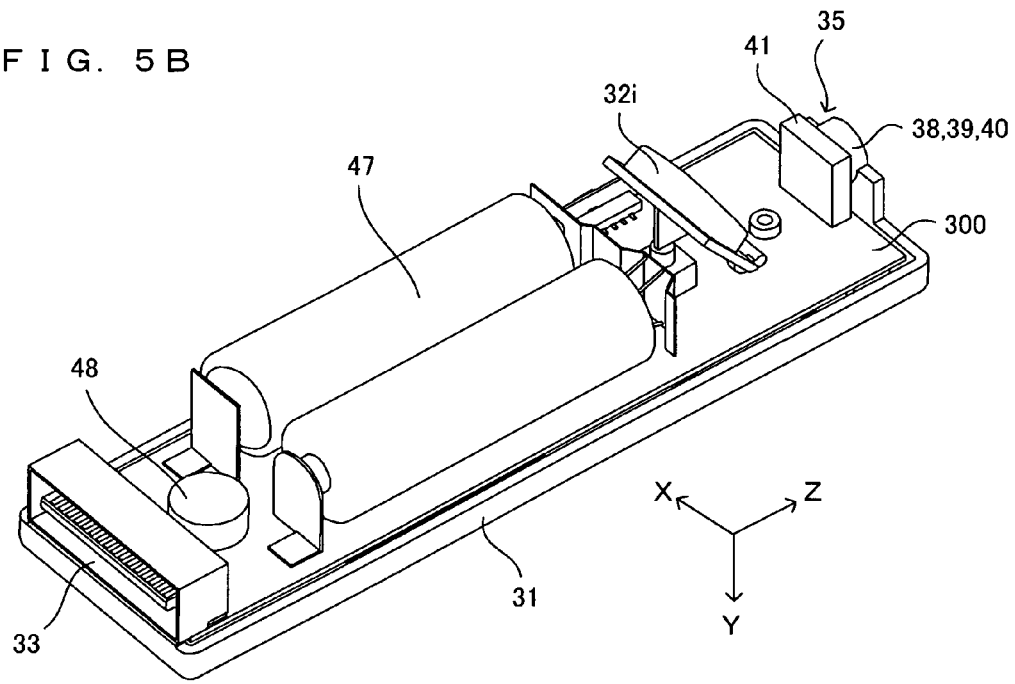
FIG. 5B shows an internal configuration of the controller 7.
Figure 6:
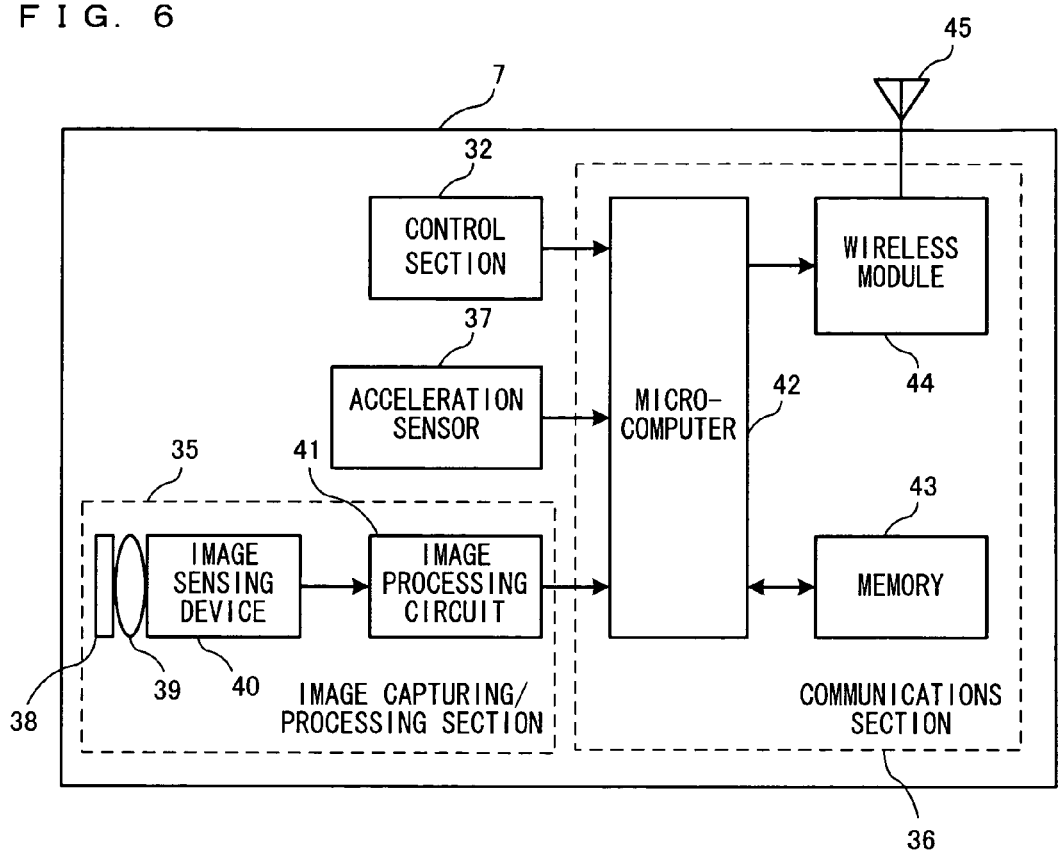
FIG. 6 is a block diagram showing a configuration of the controller 7.

Referring now to FIGS. 5A, 5B and 6, an internal configuration of the controller 7 will be described. FIGS. 5A and 5B show an internal configuration of the controller 7.

FIG. 5A is a perspective view showing the controller 7 with an upper casing (a part of the housing 31) taken off. FIG. 5B is a perspective view showing the controller 7 with a lower casing (a part of the housing 31) taken off. FIG. 5A shows one side of a substrate 300, and FIG. 5B shows the other side thereof.

In FIG. 5A, the substrate 300 is secured in the housing 31, and the control buttons 32a to 32h, an acceleration sensor 37, the LED 34, a quartz oscillator 46, a wireless module 44, an antenna 45, etc., are provided on the upper principal plane of the substrate 300. These components are connected to a microcomputer 42 (see FIG. 6) via lines (not shown) formed on the substrate 300, etc. With the wireless module 44 and the antenna 45, the controller 7 can function as a wireless controller. The quartz oscillator 46 generates a basic clock for the microcomputer 42.

Referring to FIG. 5B, the image capturing/processing section 35 is provided at the front edge on the lower principal plane of the substrate 300. The image capturing/processing section 35 includes an infrared filter 38, a lens 39, an image sensing device 40 and an image processing circuit 41 provided in this order from the front side of the controller 7, and these components are provided on the lower principal plane of the substrate 300. The connector 33 is provided at the rear edge on the lower principal plane of the substrate 300. The control button 32i is provided on the lower principal plane of the substrate 300 behind the image capturing/processing section 35, and battery cells 47 are accommodated in a position further behind the control button 32i. A vibrator 48 is provided on the lower principal plane of the substrate 300 between the battery cells 47 and the connector 33. The vibrator 48 may be, for example, a vibrating motor or a solenoid. As the vibrator 48 is actuated, the controller 7 is vibrated, and the vibration is transmitted to the hand of the player holding the controller 7, thus realizing a video game with vibration feed back.

FIG. 6 is a block diagram showing a configuration of the controller 7. In addition to the control section 32 (the control buttons) and the image capturing/processing section 35, the controller 7 includes therein the communications section 36 and the acceleration sensor 37.

Specifically, the image capturing/processing section 35 includes the infrared filter 38, the lens 39, the image sensing device 40 and the image processing circuit 41. The infrared filter 38 passes only an infrared portion of incident light entering the controller 7 from the front side. The markers 8a and 8b provided around the display screen of the monitor 2 are infrared LEDs outputting infrared light to the front side of the monitor 2. Therefore, with the provision of the infrared filter 38, it is possible to more accurately take the image of the markers 8a and 8b. The lens 39 condenses the infrared light passing through the infrared filter 38, and outputs the condensed infrared light so that it is incident upon the image sensing device 40. The image sensing device 40 is a solid-state image sensing device, such as a CMOS sensor or a CCD, for capturing the infrared light condensed through the lens 39. Therefore, the image sensing device 40 produces image data by capturing only the infrared light that has passed through the infrared filter 38. The image obtained by the image sensing device 40 will hereinafter be referred to as the "captured image". The image data produced by the image sensing device 40 is processed in the image processing circuit 41. The image processing circuit 41 calculates the positions of the imaging targets (the markers 8a and 8b) in the captured image. The image processing circuit 41 outputs coordinates representing the positions of the markers 8a and 8b in the captured image to the communications section 36. The details of the process by the image processing circuit 41 will be described later.

The acceleration sensor 37 detects the acceleration in each of three directions, i.e., the up/down direction of the controller 7 (the Y-axis direction shown in FIGS. 3A and 3B), the left/right direction (the X-axis direction shown in FIGS. 3A and 3B) and the forward/backward direction (the Z-axis direction shown in FIGS. 3A and 3B). With the acceleration sensor, it is possible to determine the inclination of the controller 7 with respect to the X-axis direction, the Y-axis direction and the Z-axis direction. Thus, the video game device 3 can detect the rotation angle of the controller 7 about the z axis not only from the captured image but also by means of the acceleration sensor 37. The acceleration sensor 37 may alternatively be an acceleration sensor capable of determining the acceleration in each of two directions, i.e., the up/down direction and the left/right direction, depending on types of control signals necessary. The data representing the acceleration determined by the acceleration sensor 37 is outputted to the communications section 36. The acceleration sensor 37 is typically a capacitance-coupling acceleration sensor. What is detected by the acceleration sensor 37 is the acceleration acting upon the device in the X-axis direction, that in the Y-axis direction and that in the Z-axis direction. Such an acceleration sensor 37 is available from, for example, Analog Devices, Inc. or STMicroelectronics N.V. It is possible to detect the inclination of the controller 7 (more specifically, the inclination thereof with respect to the image-capturing direction of the image sensing device 40) based on the acceleration data for the various axis directions outputted from the acceleration sensor 37.

The communications section 36 includes the microcomputer 42, a memory 43, the wireless module 44 and the antenna 45. The microcomputer 42 controls the wireless module 44 for wirelessly transmitting data obtained by the microcomputer 42 while using the memory 43 as a memory area.

The data outputted from the control section 32, the acceleration sensor 37 and the image capturing/processing section 35 to the microcomputer 42 are temporarily stored in the memory 43. Data are wirelessly transmitted from the communications section 36 to the receiver unit 6 at regular intervals. Since the game process typically proceeds in a cycle of 1/60 of a second, the interval should be shorter than 1/60 of a second. At the transmission time for transmitting data to the receiver unit 6, the microcomputer 42 outputs, as control data, data stored in the memory 43 to the wireless module 44. The wireless module 44 uses a technique such as Bluetooth (registered trademark) to modulate a carrier of a predetermined frequency with the control data, and radiates the weak radio wave signal from the antenna 45. Thus, the control data is modulated by the wireless module 44 into a weak radio wave signal and transmitted from the controller 7. The weak radio wave signal is received by the receiver unit 6 of the video game device 3. The video game device 3 can obtain the control data by demodulating and decoding the received weak radio wave signal. The CPU 10 of the video game device 3 performs the game process based on the obtained control data and the video game program.

Note that the shape of the controller 7, and the shape, number and arrangement of the control switches shown in FIGS. 3A to 5B are all illustrative, and it is understood that other embodiments may use any other suitable shape, number and arrangement. The position of the image capturing/processing section 35 in the controller 7 (the light receiving port 35*a* of the image capturing/processing section 35) does not have to be the front side of the housing 31, but may be on any other side as long as light can be received from outside the housing 31. Then, the "pointing direction of the controller 7" is a direction perpendicular to the light receiving port, i.e., the image-capturing direction of the image sensing device 40. Other types of pointing devices with at least one button may be used. For example, pointing devices that can be used include input devices such as a mouse provided with a click button or a tablet using a pen provided with a click button.

By using the controller 7, the player can point at any position on the screen of the monitor 2. The position on the screen pointed at by the player using the controller 7 is detected as follows.

Figure 7:
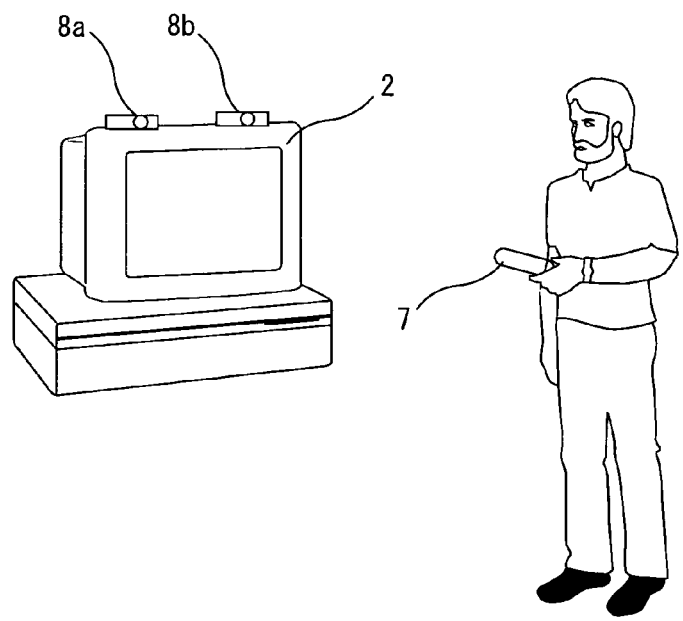
FIG. 7 generally shows how the player uses the controller 7 to perform a game operation.

FIG. 7 generally shows how the player uses the controller 7 to point at a position on the screen. As shown in FIG. 7, when pointing at a position on the screen by using the controller 7 in the video game system 1, the player holds the controller 7 in one hand. The markers 8*a* and 8*b* are arranged in parallel to the horizontal direction of the screen of the monitor 2. The player holds the controller 7 with the front side of the controller 7 (the side for receiving light to be sensed by the image capturing/processing section 35) facing toward the markers 8*a* and 8*b*. The player can change the pointed position on the screen by moving the controller 7 (i.e., by changing the position or the direction of the controller 7).

Figure 8:
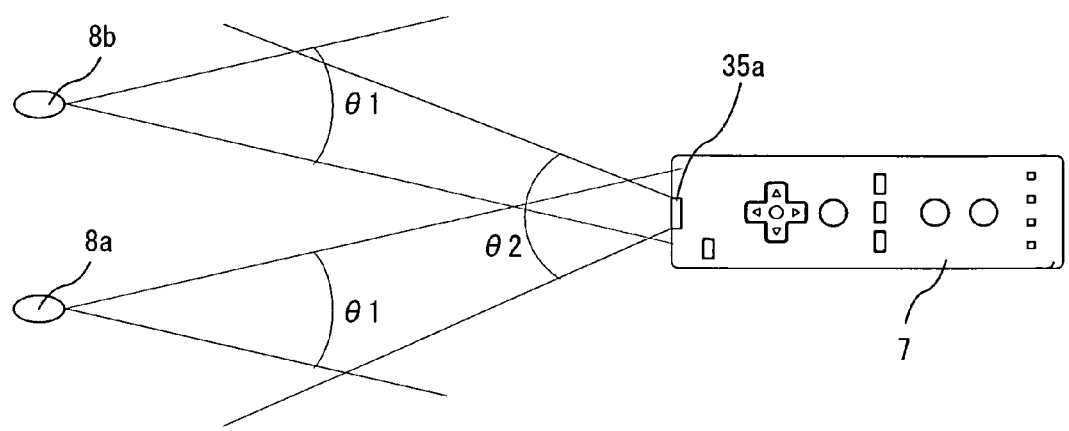
FIG. 8 shows viewing angles between markers 8a and 8b and the controller 7.
Figure 9:
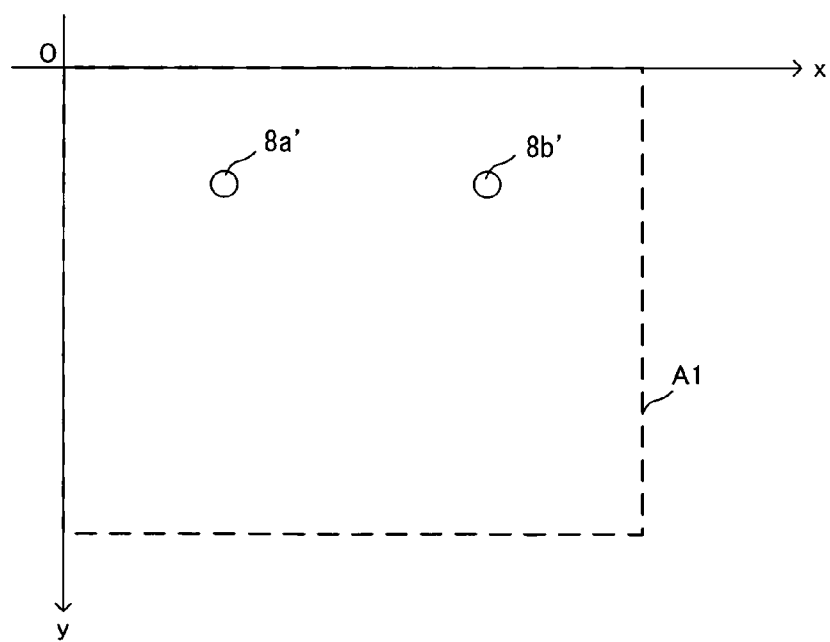
FIG. 9 shows an exemplary captured image including target images.

FIG. 8 shows the viewing angles of the markers 8*a* and 8*b* and that of the controller 7. As shown in FIG. 8, the markers 8*a* and 8*b* each radiate infrared light over a viewing angle θ1. The image sensing device 40 of the image capturing/processing section 35 can receive incident light within a range of a viewing angle θ2 about the viewing direction of the controller 7. For example, the viewing angle θ1 of each of the markers 8*a* and 8*b* is 34° (half angle), and the viewing angle θ2 of the image sensing device 40 is 41°. When the markers 8*a* and 8*b* are both present within the viewing angle θ2 of the image sensing device 40 and when the image sensing device 40 is present within the viewing angle θ1 of the marker 8*a* and within the viewing angle θ1 of the marker 8*b*, the video game device 3 detects the position on the screen of the monitor 2 being pointed at by the controller 7 by using the position data of the high-luminance points of the two markers 8*a* and 8*b*.

For example, assume a case where the two markers 8*a* and 8*b* are installed on the upper surface of the monitor 2 (see FIG. 7), and the player points at the center of the screen of the monitor 2 using the controller 7 whose upper surface is facing up (where the center of the screen is being at the center of the image captured by the image capturing/processing section 74). Then, in the image captured by the image capturing/processing section 74, the middle point of the target image (the middle point between the markers 8*a* and 8*b*) does not coincide with the pointed position (the center of the screen). Specifically, the positions of the target images 8*a*' and 8*b*' in the captured image A1 are shifted upward off the center of the captured image A1. A reference position is set so that the center of the screen is pointed at when the target images 8*a*' and 8*b*' are located at such positions. As the controller 7 is moved, the positions of the target images 8*a*' and 8*b*' in the captured image A1 are also moved (in the opposite direction to the moving direction of the controller 7). Therefore, it is possible to obtain, as an input position, the position on the screen being pointed at by the controller 7 based on the positions of the target images 8*a*' and 8*b*' in the captured image A1. Thus, the controller 7 functions as the pointing device for pointing at a position on the screen of the monitor 2.

As to the reference position setting, the player may point at a predetermined position on the screen (e.g., the center of the screen) with the controller 7, and the positions of the target images 8*a*' and 8*b*' at that time may be stored while being associated with the predetermined reference position. Alternatively, the reference position may be a predetermined position if the positional relationship between the target images 8*a*' and 8*b*' and the screen is fixed. The input position in the screen coordinate system being pointed at by the controller 7 is calculated by using a function for calculating the coordinates of a position on the screen of the monitor 2 from the coordinates of the target images 8*a*' and 8*b*'.

The method for detecting the position on the screen pointed at by the controller 7 is not limited to a method using a captured image as described above, but may be any other suitable method. For example, the position on the screen pointed at by the controller 7 may be detected by using output values from the acceleration sensor 37.

A character input method using the video game system 1 will now be described in detail. The user needs to input a character string when, for example, inputting the name of a video game character. In the following example, the user names a video game character "かたつむり" (read "KA-TA-TSU-MU-RI") using Japanese characters.

Figure 10A:
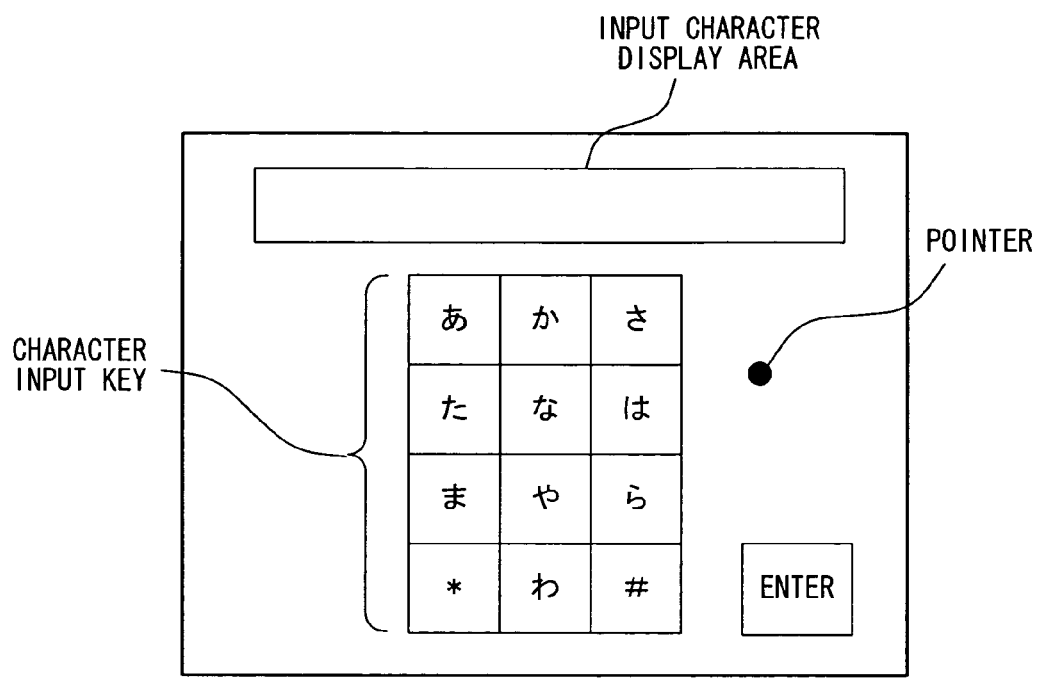
FIG. 10A shows an exemplary screen of a monitor 2 during a character input operation.

Referring to FIG. 10A, displayed in the character name input screen are a pointer, a plurality of character input key images, an input character display area, and an enter key image. The pointer is an image representing the position on the screen being pointed at by the controller 7.

A character input key image is an image representing the area to be pointed at by the controller 7 when the user inputs a character. Each character input key image is assigned a group of characters. For example, the character input key image labeled "あ" (read "a") (hereinafter referred to simply as the "あ key") is assigned the following five characters: あ (a), い (i), う (u), え (e) and お (O), of the あ column in the Japanese syllabary of kana characters (see FIG. 12). Similarly, the か key is assigned the following five characters: か (ka), き (ki), く (ku), け (ku) and こ (ko), of the か column in the Japanese syllabary. The * key is assigned the following five symbols: *, +, <and >, and the # key is assigned the following five symbols: #, !, $, % and &.

What is assigned to each character input key image is not limited to kana characters or symbols. For example, a group of English alphabet characters or a group of words (e.g., "YES" and "NO") may be assigned to each character input key image. While a plurality of character input key images are displayed on the screen in the illustrated example, other embodiments may be used where only one character input key image is displayed on the screen. For example, there may be only one character input key image displayed on the screen, which is assigned two symbols, o and x, whereby the user can be prompted to input either o or x using the character input key image.

The user can input an intended character by pressing the select button (e.g., the A button 32*i*) on the controller 7 a certain number of times while the pointer is aimed at the character input key image that is assigned the intended character. The details of this operation will be described later.

While a group of characters from one column of the Japanese syllabary are assigned to each character input key in the illustrated example, the present invention is not limited to any particular character-key assignment. Note however that it is more likely that the user needs to press the select button on the controller 7 a greater number of times to input a character as more characters are assigned to each character input key. Therefore, each character input key should be assigned an appropriate number of characters in view of the size of the controller 7 and the total number of characters and symbols to be used.

The input character display area is an area for displaying a character string inputted by the user. The enter key image is an image representing an area that should be pointed at by the user with the controller 7 when the user intends to end the character string input operation. The character string being displayed in the input character display area can be registered as the character name when the user presses the select button on the controller 7 (e.g., the A button 32i) while the pointer is aimed at the enter key image.

Figure 10B:
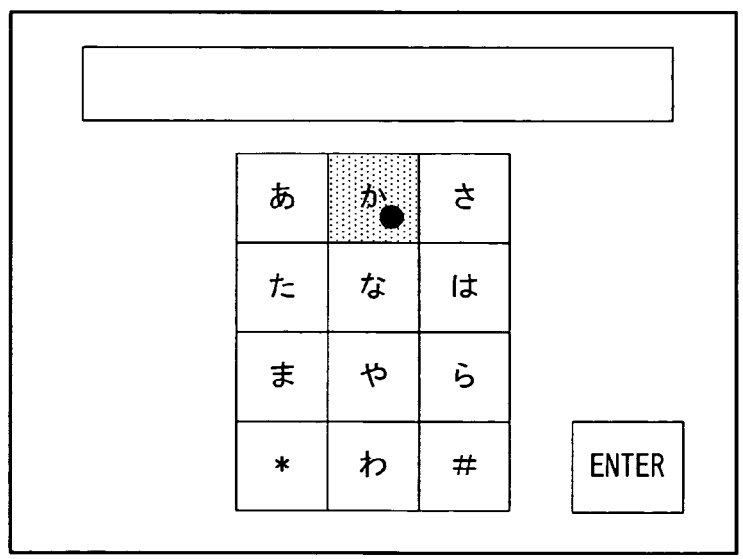
FIG. 10B shows an exemplary screen of the monitor 2 during a character input operation.

FIG. 10B shows the screen of the monitor 2 when the か key is pointed at by the user with the controller 7 for inputting the character か. The character input key image (the か key in the illustrated example) being pointed at is displayed in a different color than the other character input key images so that the user readily knows which character input key image is being pointed at. In other embodiments, for example, the character input key image being pointed at may be enlarged, or it may be displayed in the same manner as the other character input key images.

Figure 10C:
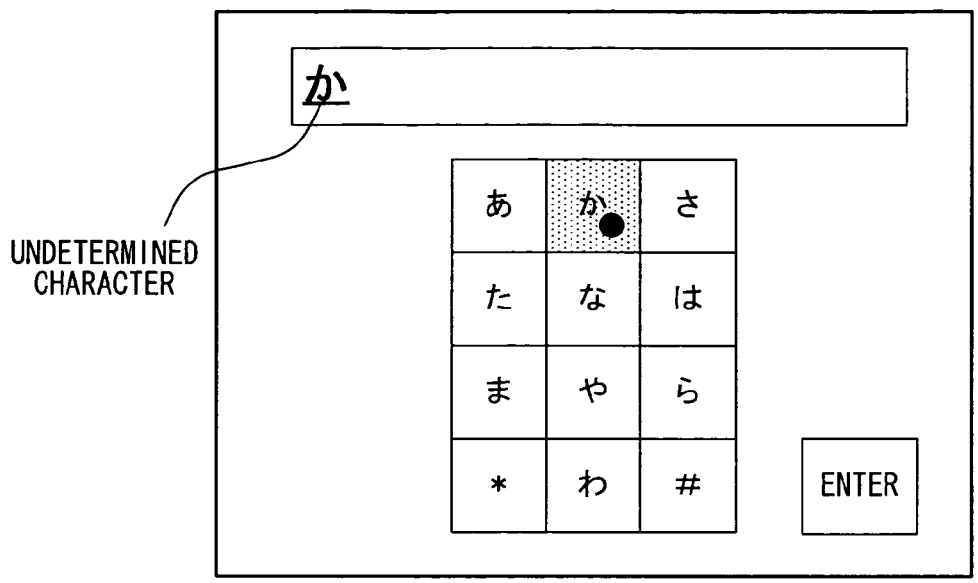
FIG. 10C shows an exemplary screen of the monitor 2 during a character input operation.
Figure 10D:
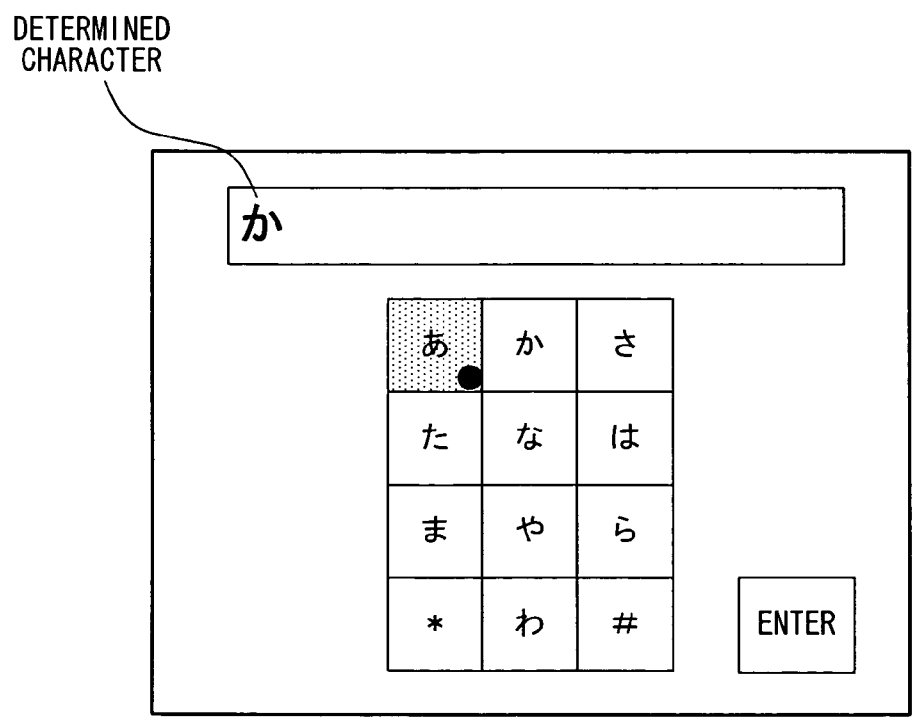
FIG. 10D shows an exemplary screen of the monitor 2 during a character input operation.

When the user presses the select button on the controller 7 while the pointer is on the か key as shown in FIG. 10B, the character か is displayed as an "undetermined character" in the input character display area as shown in FIG. 10C. An undetermined character as used herein refers to a character being in such a state that it can be turned into another character if the user again presses the select button. If the user repeatedly presses the select button on the controller 7 while the pointer is located on the same character input key image, the characters assigned to the character input key image can be cyclically displayed (for example in the following order: か, き, く, け, こ, か, き, , ... ) in the input character display area as an undetermined character. In the input character display area, the undetermined character is underlined so that the user can easily distinguish it from a determined character to be described later. Other embodiments may use distinctions other than underlining so that the user can distinguish between an undetermined character and a determined character. For example, an undetermined character and a determined character may be displayed in different colors.

In the state of FIG. 10C, if the user moves the position pointed at by the controller 7 (the pointer position) out of the か key (i.e., if the pointer position moves out of the か key), the undetermined character か in the input character display area turns into a determined character.

Figure 10E:
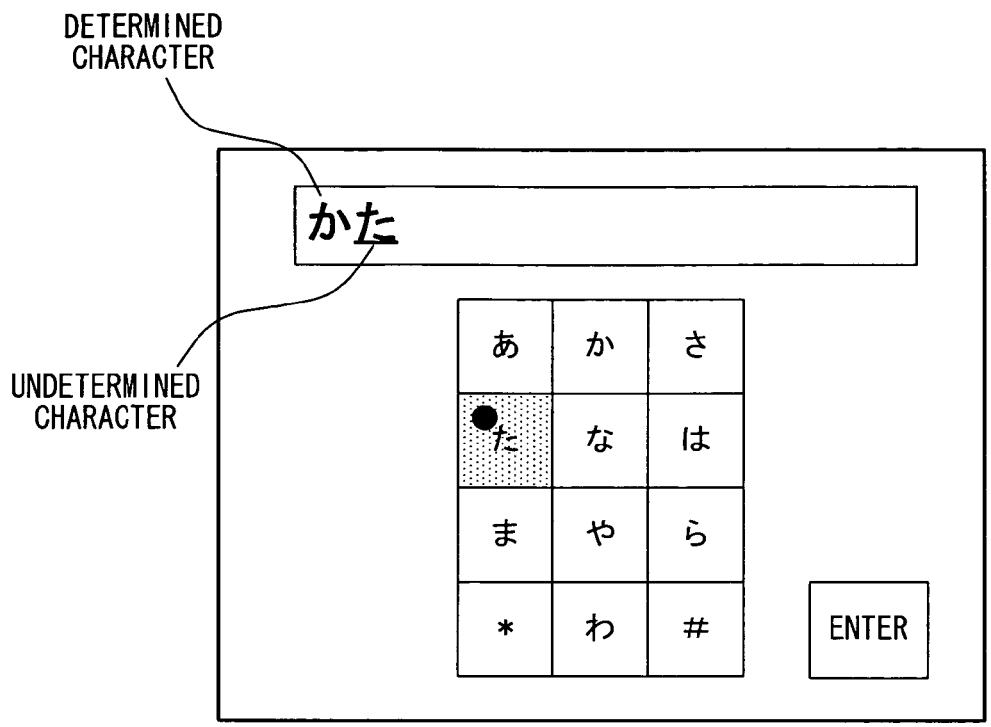
FIG. 10E shows an exemplary screen of the monitor 2 during a character input operation.
Figure 10F:
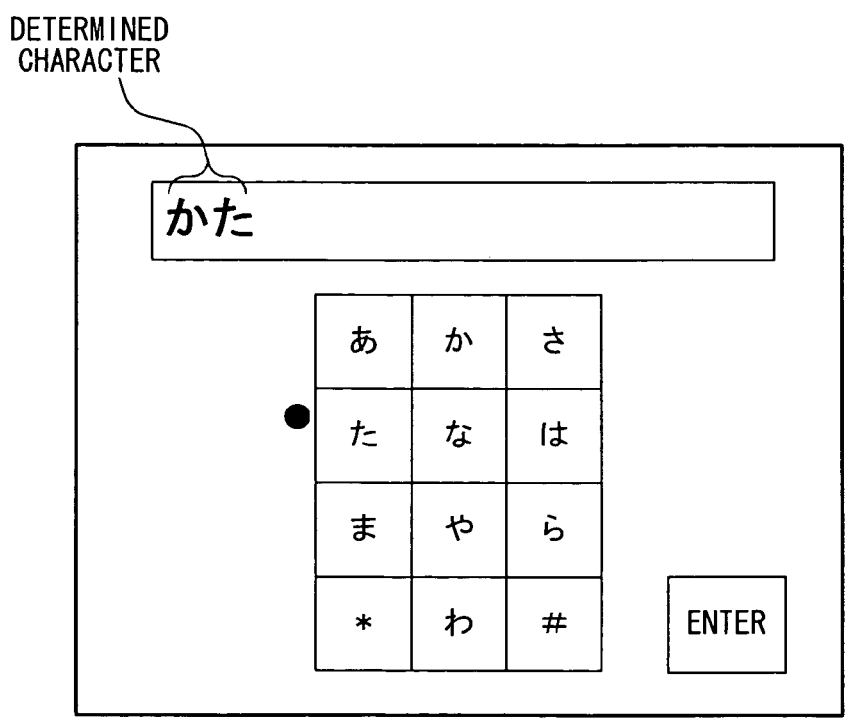
FIG. 10F shows an exemplary screen of the monitor 2 during a character input operation.

Then, if the user moves the pointer onto the た (ta) key and presses the select button on the controller 7, た is displayed, as an undetermined character, following the determined character か in the input character display area as shown in FIG. 10E. Then, before inputting the next character つ (tsu) in the string かたつむり, the user needs to turn the undetermined character た into a determined character. With conventional methods, the user needs to press a determination button in order to turn the undetermined character た into a determined character. In contrast in this illustrative non-limiting embodiment this can be done only by moving the position pointed at by the controller 7 out of the た key (i.e., only by slightly moving the pointer) as shown in FIG. 10F.

Figure 10G:
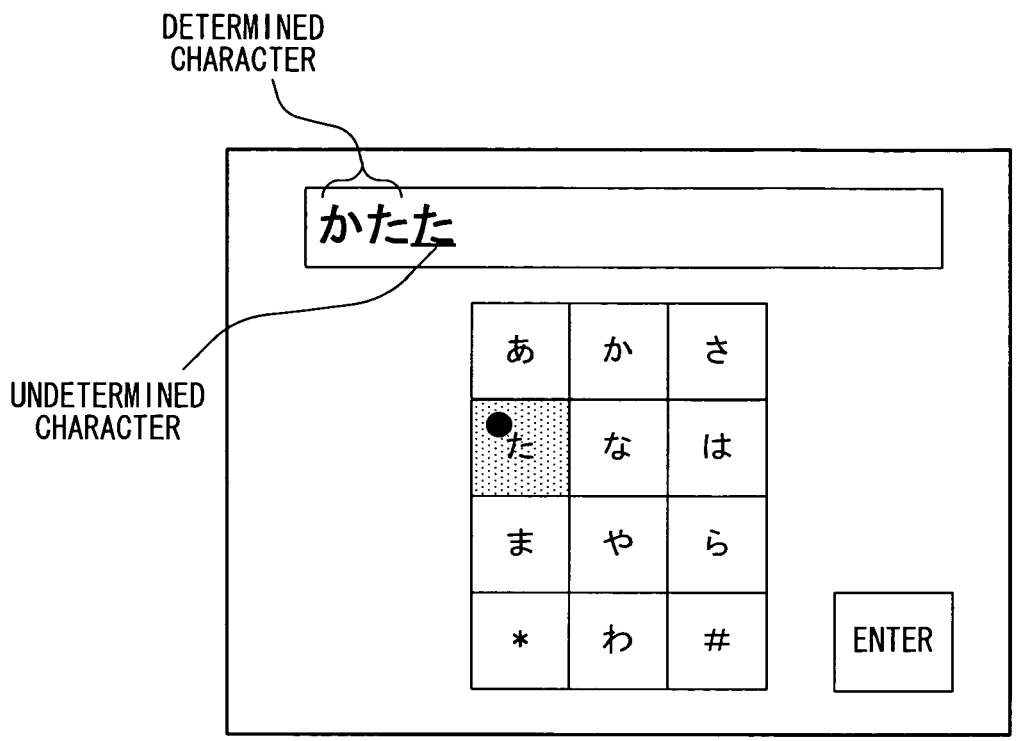
FIG. 10G shows an exemplary screen of the monitor 2 during a character input operation.
Figure 10H:
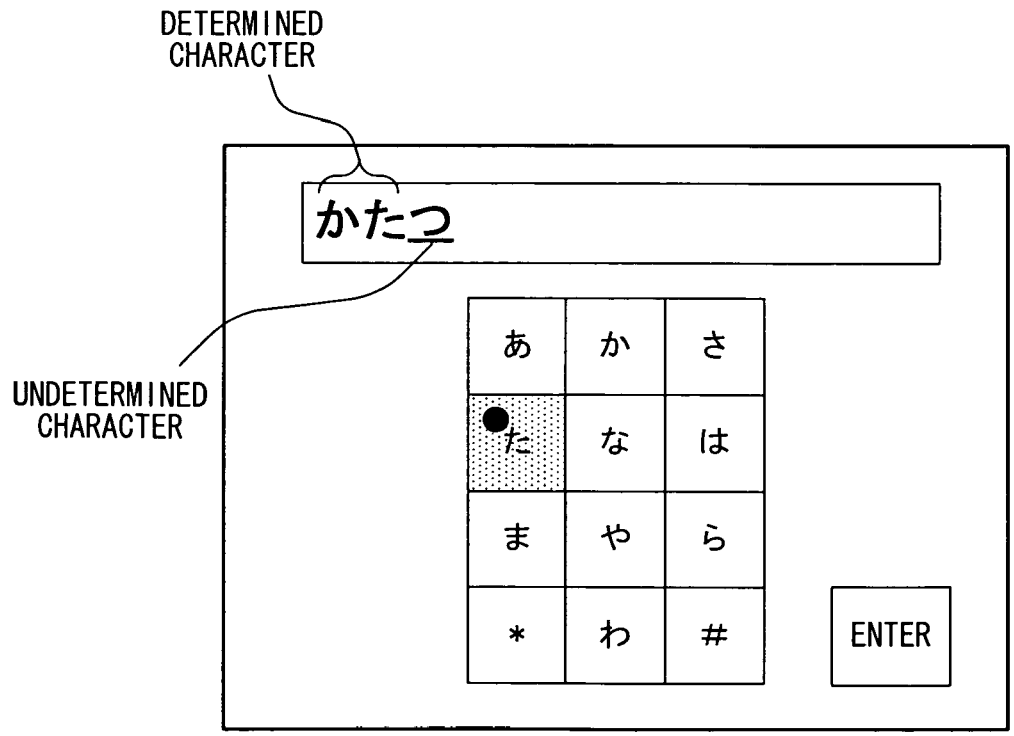
FIG. 10H shows an exemplary screen of the monitor 2 during a character input operation.

After confirming that た has turned into a determined character, the user moves the position pointed at by the controller 7 back onto the た key and presses the select button on the controller 7, whereby an undetermined character た is displayed following the determined character string かた as shown in FIG. 10G. Then, if the user presses the select button on the controller 7 again, the undetermined character is turned into ち (chi). If the user presses the select button on the controller 7 one more time, the undetermined character is turned into つ as shown in FIG. 10H.

Figure 10I:
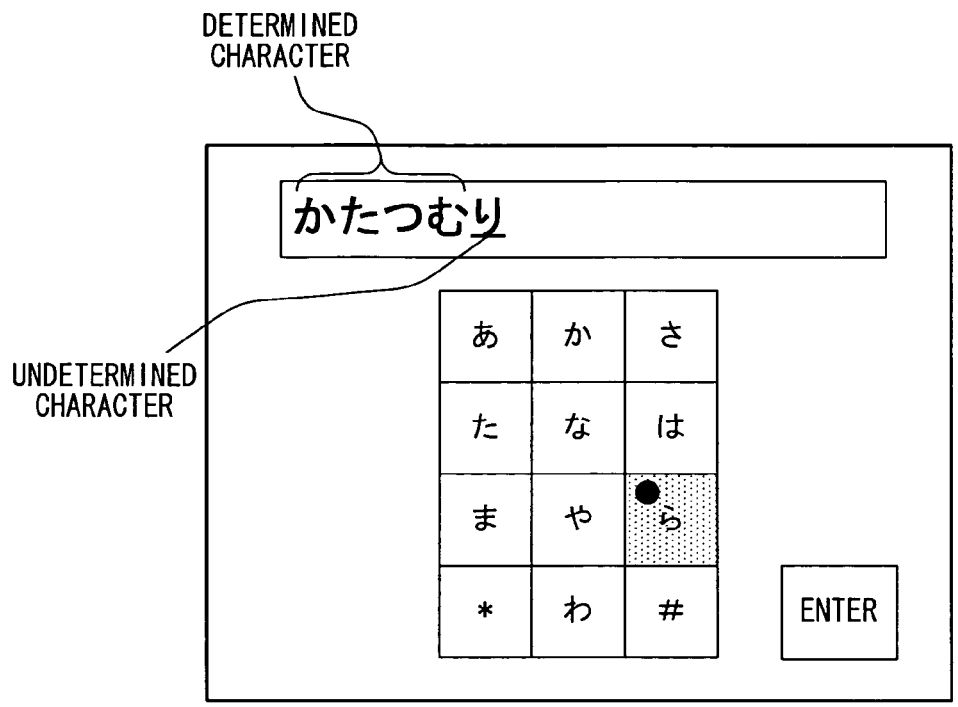
FIG. 10I shows an exemplary screen of the monitor 2 during a character input operation.

Then, the user moves the pointer onto the ま (ma) key, presses the select button on the controller 7 three times (causing a shift from ま to み (mi) and to む (mu)), moves the pointer onto the ら (ra) key, and presses the select button on the controller 7 twice (causing a shift from ら to り (ri)), whereby the character string かたつむり is displayed in the input character display area as shown in FIG. 10I. Then, the user moves the pointer onto the enter key image and presses the select button on the controller 7 to thereby register the character string かたつむり displayed in the input character display area as the character name.

The operation of the video game device 3 for realizing the character input process as described above will now be described in detail.

Figure 11:
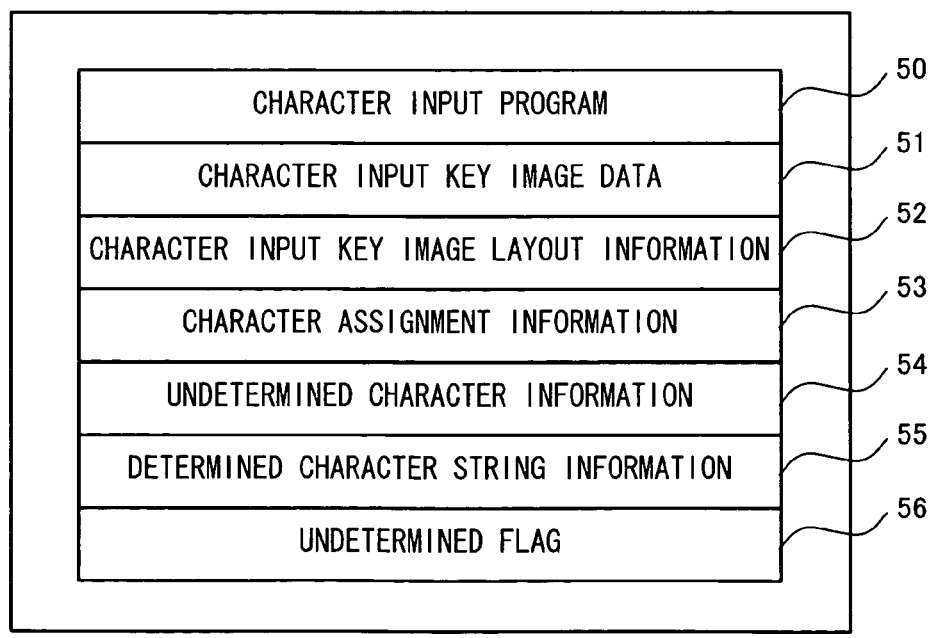
FIG. 11 shows a memory map of a main memory 13.

FIG. 11 shows a memory map of the main memory 13. The main memory 13 stores a character input program 50, character input key image data 51, character input key image layout information 52, the character assignment information 53, undetermined character information 54, determined character string information 55, and an undetermined flag 56.

The character input program 50 is loaded from the optical disc 4 to the main memory 13, and is then executed by the CPU 10. The character input key image data 51 is image data used for displaying the character input key images on the screen of the monitor 2. The character input key image layout information 52 is information representing the display position of each character input key image on the screen of the monitor 2. The character assignment information 53 is information representing a group of characters assigned to each character input key image, and the order in which the characters are displayed (the order in which the characters are cyclically displayed, as an undetermined character, as the user presses the select button on the controller 7). A specific example of the character assignment information 53 is shown in FIG. 12. The undetermined character information 54 represents the undetermined character to be displayed in the input character display area. The determined character string information 55 represents the determined character string to be displayed in the input character display area. The undetermined flag 56 indicates whether or not an undetermined character is being displayed in the input character display area, wherein the undetermined flag 56 is ON when an undetermined character is being displayed in the input character display area, and OFF otherwise.

Figure 14:
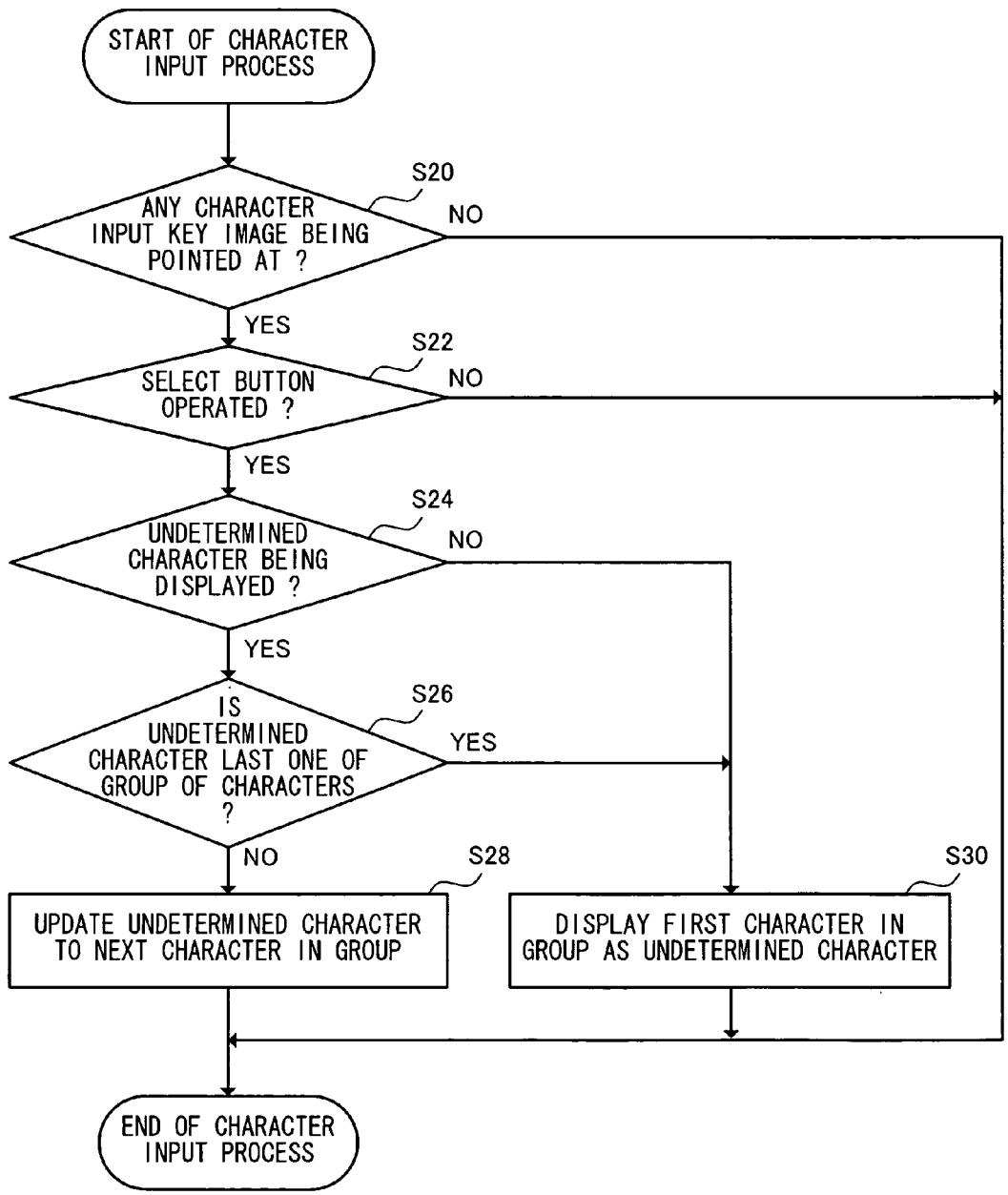
FIG. 14 is a flow chart showing the flow of a character input process.
Figure 15:
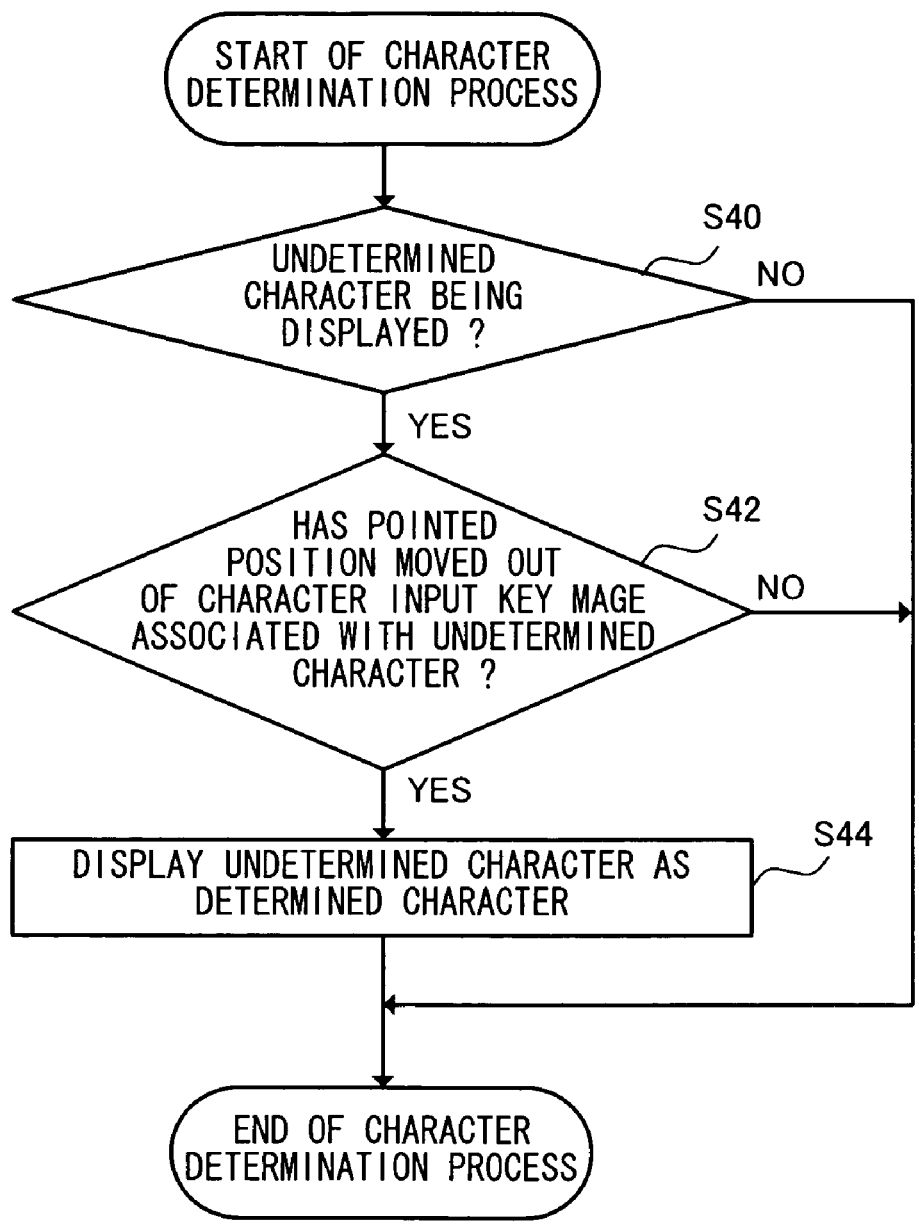
FIG. 15 is a flow chart showing the flow of a character determination process.

Referring now to the flow charts of FIGS. 13 to 15, the flow of the process performed by the CPU 10 based on the character input program 50 will be described.

After the start of the main process, in step S10, the CPU 10 detects the position pointed at by the controller 7 based on a signal from the controller 7 received by the receiver unit 6.

In step S12, the CPU 10 performs a character input process. Referring now to FIG. 14, the details of the character input process will be described.

After the start of the character input process, in step S20, the CPU 10 determines whether or not any character input key image is being pointed at by the controller 7. For example, this can be done by referring to the position pointed at by the controller 7 detected in step S10 and the character input key image layout information 52. If any character input key image is being pointed at by the controller 7, the process proceeds to step S22. Otherwise, the CPU 10 exits the character input process, and the process proceeds to step S14 of FIG. 13.

In step S22, the CPU 10 determines whether or not the select button on the controller 7 is operated based on a signal from the controller 7 received by the receiver unit 6. If it is determined that the select button on the controller 7 is operated, the process proceeds to step S24. Otherwise, the CPU 10 exits the character input process, and the process proceeds to step S14 of FIG. 13. Whether the select button is operated can be determined by detecting the pressing down of the select button or the release thereof.

In step S24, the CPU 10 determines whether or not an undetermined character is being displayed in the input character display area. For example, this can be done by referring to the undetermined flag 56. If an undetermined character is being displayed, the process proceeds to step S26. Otherwise, the process proceeds to step S30. When the process proceeds from step S24 to step S30, the undetermined flag 56 is turned ON.

In step S26, the CPU 10 determines whether or not the undetermined character being displayed in the input character display area is the last character of the group of characters assigned to the corresponding character input key image. For example, this can be done by referring to the character assignment information 53 and the undetermined character information 54. If the undetermined character is the last character of the group of characters assigned to the corresponding character input key image, the process proceeds to step S30. Otherwise, the process proceeds to step S28.

In step S28, the CPU 10 updates the undetermined character information 54 so that the undetermined character being displayed in the input character display area turns into the next character of the group of characters assigned to the same character input key image. After step S28, the CPU 10 exits the character input process, and the process proceeds to step S14 of FIG. 13.

In step S30, the CPU 10 updates the undetermined character information 54 so that the first character of the group of characters assigned to the character input key image being pointed at by the controller 7 is displayed in the input character display area as the undetermined character. After step S30, the CPU 10 exits the character input process, and the process proceeds to step S14 of FIG. 13.

Figure 13:
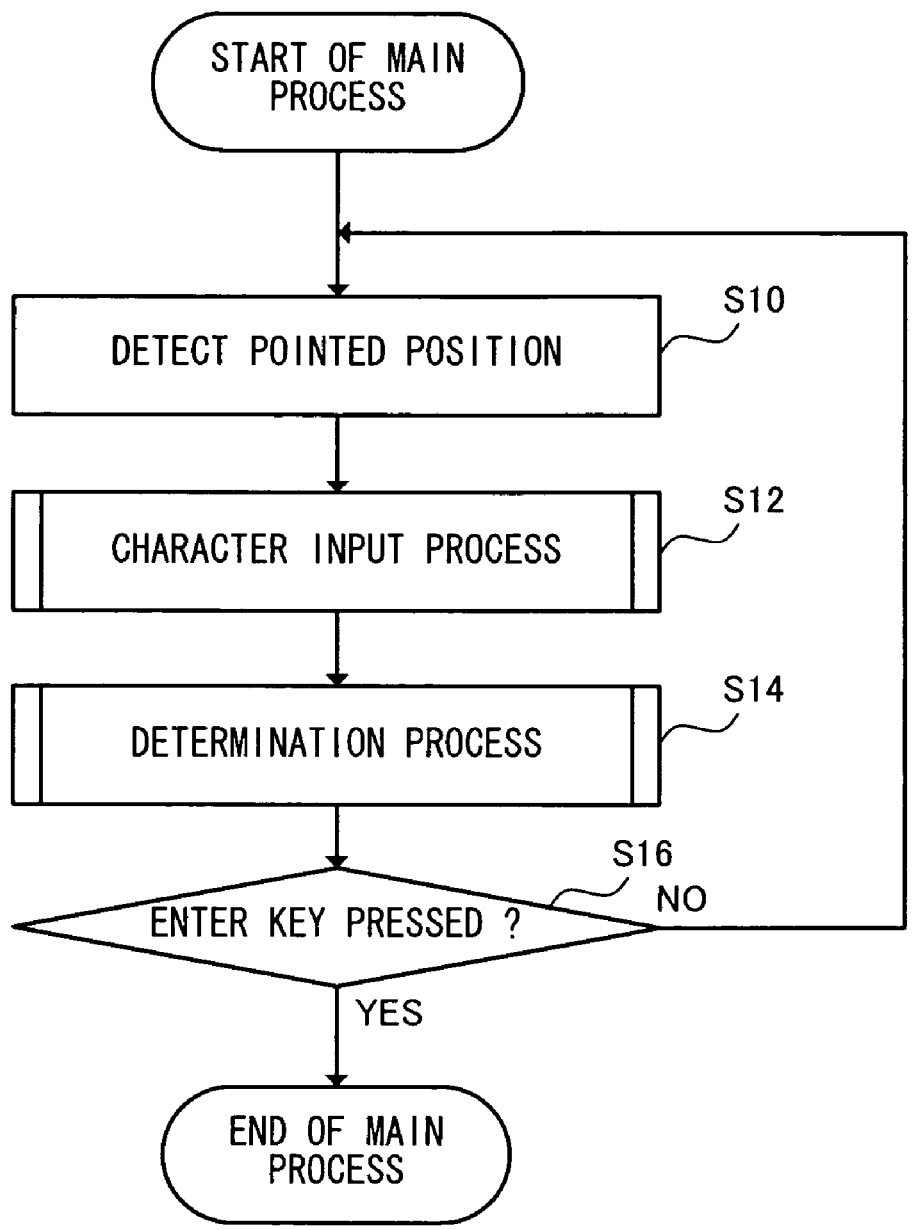
FIG. 13 is a flow chart showing the flow of a main process.

In step S14 of FIG. 13, the CPU 10 performs a character determination process. Referring now to FIG. 15, the details of the character determination process will be described.

After the start of the character determination process, the CPU 10 determines in step S40 whether or not an undetermined character is being displayed in the input character display area. If an undetermined character is being displayed, the process proceeds to step S42. Otherwise, the CPU 10 exits the character determination process, and the process proceeds to step S16 of FIG. 13.

In step S42, the CPU 10 determines whether or not the position pointed at by the controller 7 has moved out of the character input key image associated with the undetermined character being displayed in the input character display area. For example, this can be done by referring to the position pointed at by the controller 7 detected in step S10 and the character input key image layout information 52. If the position pointed at by the controller 7 has moved out of the character input key image associated with the undetermined character, the process proceeds to step S44. Otherwise, the CPU 10 exits the character determination process, and the process proceeds to step S16 of FIG. 13. When the process proceeds from step S42 to step S44, the undetermined flag 56 is turned OFF.

In step S44, the CPU 10 updates the undetermined character information 54 and the determined character string information 55 so that the undetermined character being displayed in the input character display area turns into a determined character. After step S44, the CPU 10 exits the character determination process, and the process proceeds to step S16 of FIG. 13.

In step S16 of FIG. 13, the CPU 10 determines whether or not the player's enter key operation (an operation of pressing the select button on the controller 7 while the pointer is on the enter key image) has been performed. If the player's enter key operation has been performed, the CPU 10 stores the determined character string information 55 as necessary, and exits the character input program. Otherwise, the process returns to step S10.

As described above in a non-limiting illustrative embodiment the user can quickly and easily turn an undetermined character into a determined character through a very simple operation of moving the position pointed at by the controller 7 out of the character input key image associated with the undetermined character. Therefore, it is possible to suppress the lowering of the character input speed and the possibility of erroneous inputs. Since an undetermined character is displayed in the input character display area at a position following the determined character string, the user can easily know what the determined character string will be after the undetermined character is turned into a determined character, whereby the possibility of erroneous inputs can be reduced.

In a non-limiting illustrative embodiment the change from an undetermined character displayed in the input character area into a determined character is notified to the user only by removing the underline from the undetermined character. In other embodiments the user may be notified of the change by means of a sound, an animation, or a vibration of the controller 7. Then, a new user can intuitively learn a character input method, where an undetermined character is turned into a determined character when the pointed position moves out of the character input key image associated with the undetermined character. The user can know that an undetermined character has turned into a determined character even without looking at the determined character string, thus improving the controllability.

While an undetermined character is displayed in the input character display area in the present embodiment, the present invention is not limited thereto, and an undetermined character may be displayed at any position.

Figure 16A:
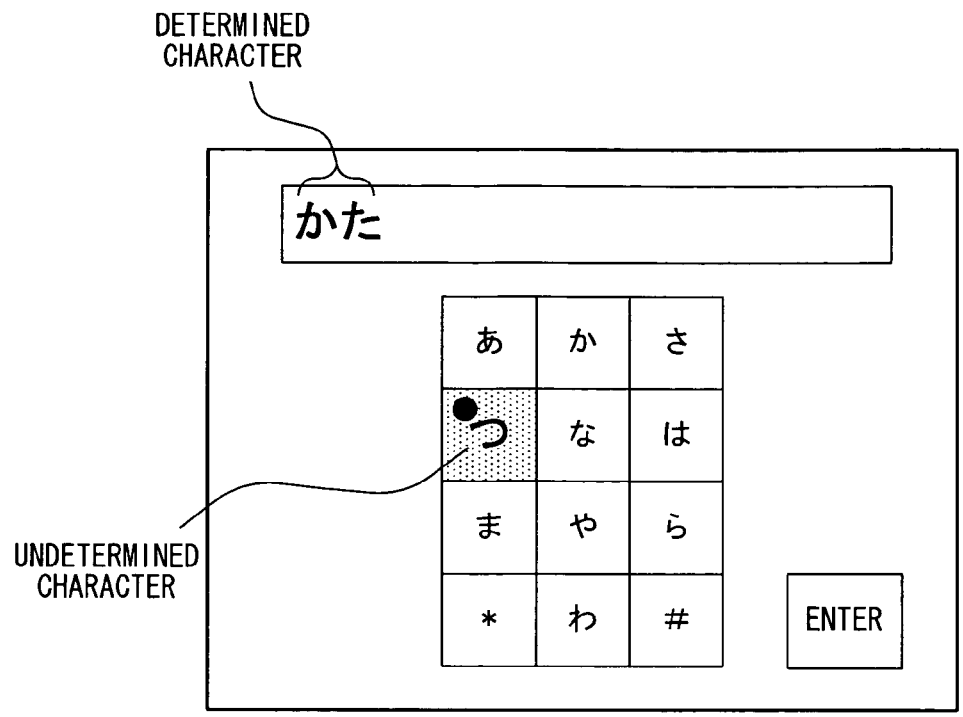
FIG. 16A shows an exemplary screen of the monitor 2 during a character input operation.
Figure 16B:
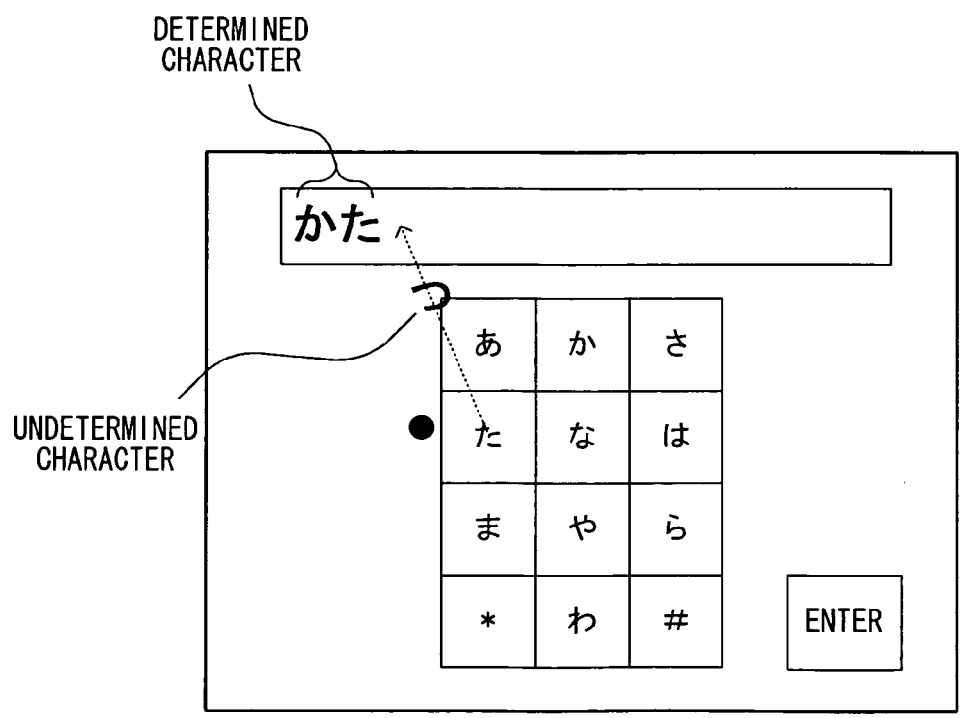
FIG. 16B shows an exemplary screen of the monitor 2 during a character input operation.

In a first variation as to where an undetermined character is displayed, the undetermined character may be displayed in the character input key image being pointed at by the controller 7 as shown in FIG. 16A. FIG. 16A shows a case where the select button on the controller 7 has been pressed three times while the pointer is on the た key. Then, the undetermined character is displayed near the pointed position, whereby the user no longer needs to move the eyes substantially away from the pointed position in order to check the undetermined character, thus improving the controllability. In this case, it is preferred that the undetermined character is highlighted as shown in FIG. 16A (e.g., by using a larger size than characters displayed on the other character input key images as in the illustrated example), whereby the user can readily know that the character displayed on the た key is an undetermined character. An undetermined character can be highlighted by, for example, changing at least one of the size, color, shape and position of the character. In this case, when an undetermined character turns into a determined character, there may be provided an animation to show the undetermined character moving out of the character input key image to a position following the determined character string as shown in FIG. 16B. Then, it is possible to naturally guide the user's eyes away from the character input key image and into the input character display area, whereby the user can reliably be notified of the change from an undetermined character to a determined character. Moreover, a new user can intuitively learn the character input method of the present invention, where an undetermined character is turned into a determined character when the pointed position moves out of the character input key image associated with the undetermined character.

Figure 17:
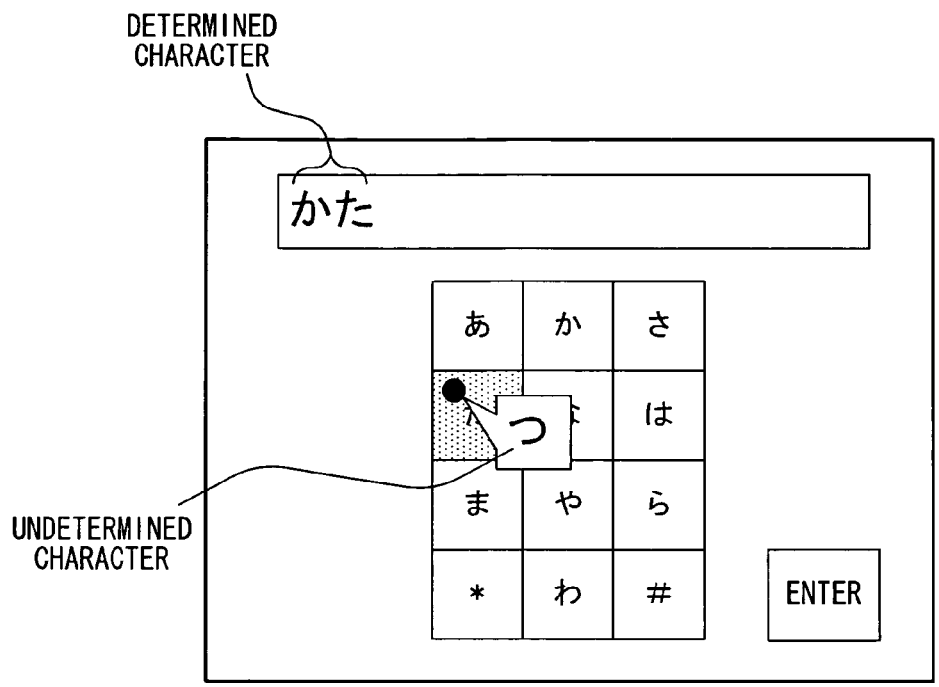
FIG. 17 shows an exemplary screen of the monitor 2 during a character input operation.

In a second variation as to where an undetermined character is displayed, the undetermined character may be displayed near the position pointed at by the controller 7 (i.e., the pointer position) so that the undetermined character moves together with the pointed position as shown in FIG. 17. Thus, the undetermined character is displayed near the pointed position, whereby the user no longer needs to move the eyes substantially away from the pointed position in order to check the undetermined character, thus improving the controllability.

Alternatively, or in addition, the user may be notified of the undetermined character being displayed on the screen via a sound outputted from the speaker 22. For example, the sound of か may be outputted from the speaker 22 when the undetermined character か is displayed on the screen, and the sound of き may be outputted from the speaker 22 when the undetermined character is changed from か to き. Thus, the user can audibly check the undetermined character, whereby the user no longer needs to move the eyes substantially away from the pointed position in order to check the undetermined character, thus improving the controllability.

While the present non-limiting illustrative embodiment is directed to a case where the user inputs Japanese characters, other embodiments may use character input methods for any other languages. Referring now to FIGS. 18A to 21, a case where the user names a video game character "HONEY" will be described.

Figure 18A:
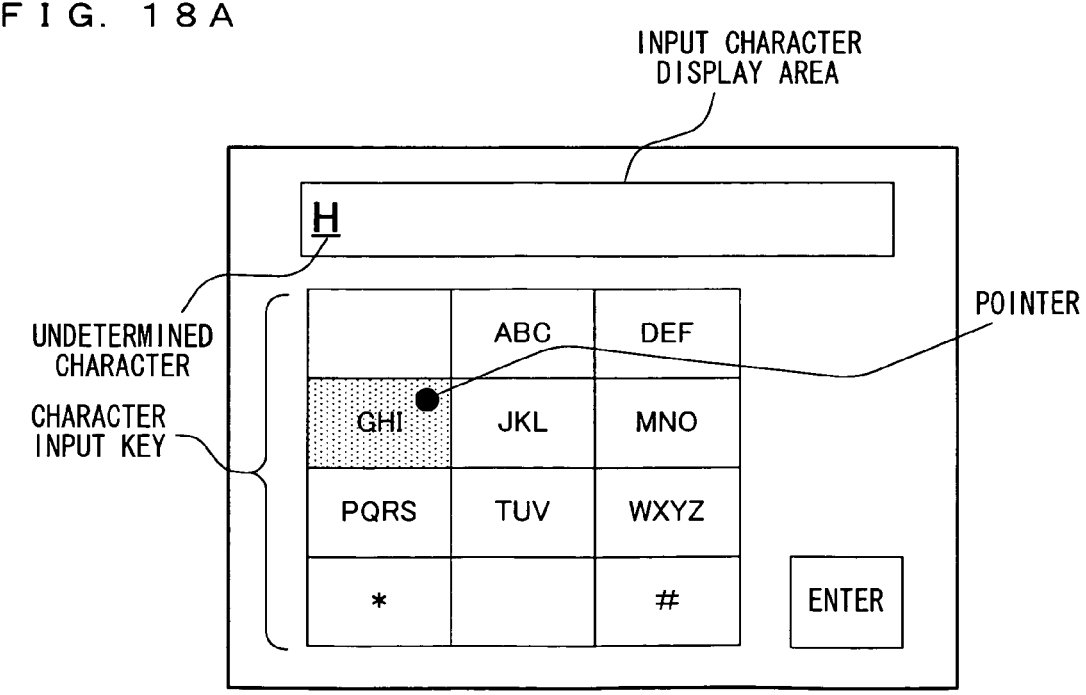
FIG. 18A shows an exemplary screen of the monitor 2 during a character input operation.

In the example shown in FIG. 18A, each character input key image is assigned a group of characters (English alphabet characters). For example, the character input key image labeled "ABC" (hereinafter referred to simply as the "ABC key") is assigned three English alphabet characters: A, B and C (see FIG. 19). Similarly, the "DEF" key is assigned three English alphabet characters: D, E and F. The * key is assigned the following five symbols: *, +, −, <and >, and the # key is assigned the following five symbols: #, !, $, % and &. The user can input an intended character by pressing the select button (e.g., the A button 32i) on the controller 7 a certain number of times while the pointer is aimed at the character input key image that is assigned the intended character. The present invention is not limited to any particular character-key assignment. Note however that it is more likely that the user needs to press the select button on the controller 7 a greater number of times to input a character as more characters are assigned to each character input key. Therefore, each character input key should be assigned an appropriate number of characters in view of the size of the controller 7 and the total number of characters and symbols to be used.

If the user presses the select button on the controller 7 twice (causing a shift from "G" to "H") while the pointer is being on the "GHI" key, "H" is displayed, as an undetermined character, in the input character display area as shown in FIG. 18A. If the user repeatedly presses the select button on the controller 7 while the pointer is located on the same character input key image, the characters assigned to the character input key image can be cyclically displayed (for example in the following order: "G", "H", "I", "G", "H", ...) in the input character display area as an undetermined character.

Figure 18B:
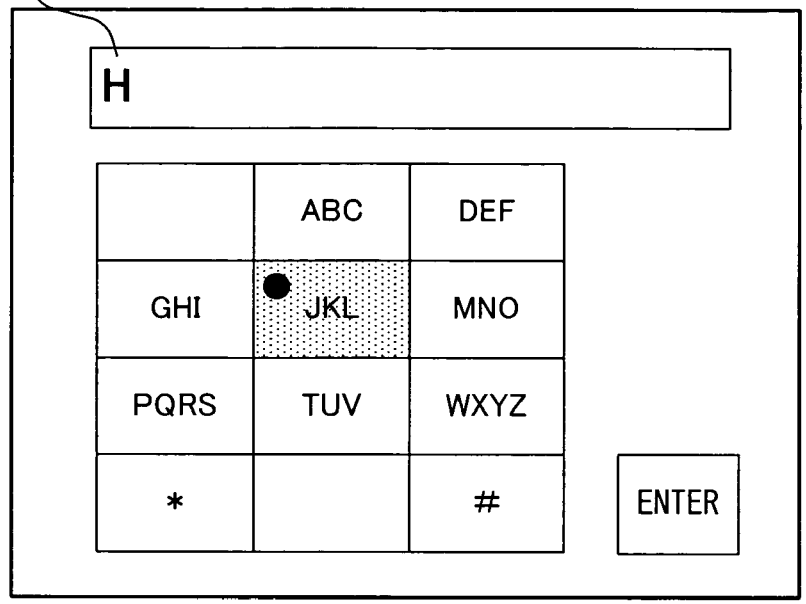
FIG. 18B shows an exemplary screen of the monitor 2 during a character input operation.

In the state of FIG. 18A, if the user moves the position pointed at by the controller 7 (the pointer position) out of the "GHI" key (i.e., if the pointer position moves out of the "GHI" key), the undetermined character "H" in the input character display area turns into a determined character as shown in FIG. 18B.

Figure 18C:
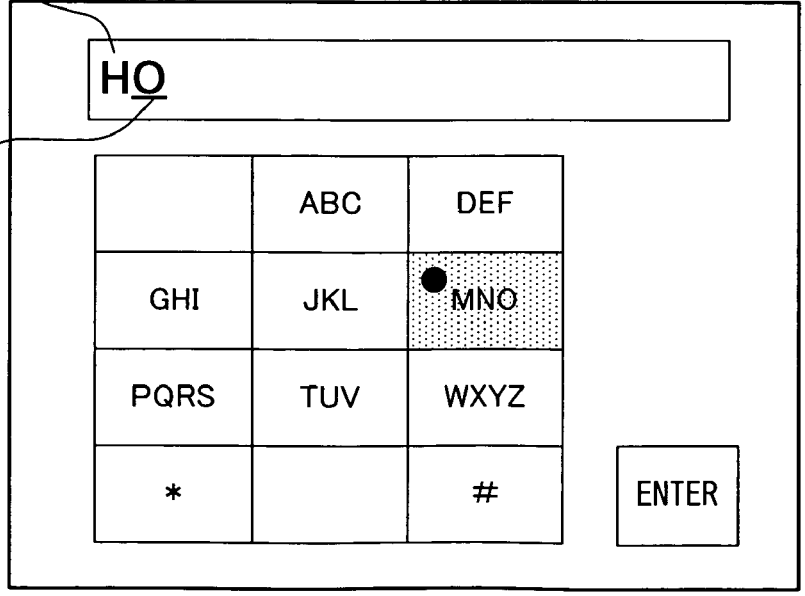
FIG. 18C shows an exemplary screen of the monitor 2 during a character input operation.
Figure 18D:
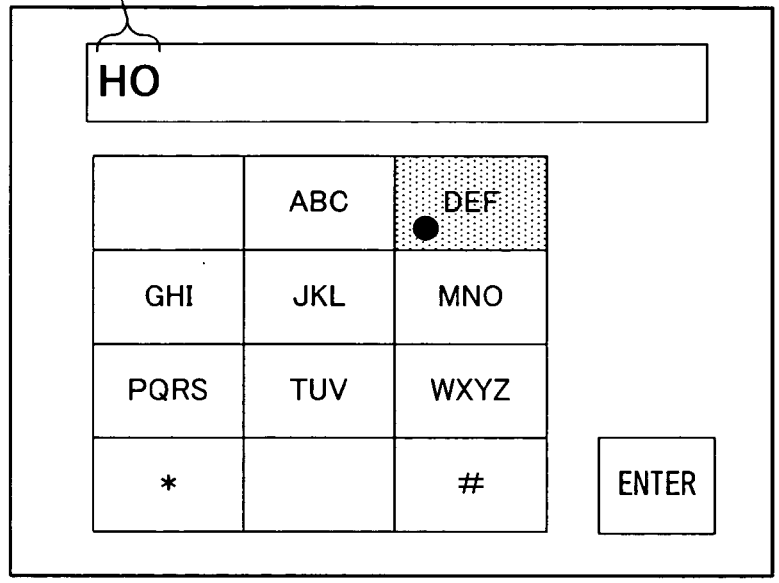
FIG. 18D shows an exemplary screen of the monitor 2 during a character input operation.

Then, if the user moves the pointer onto the "MNO" key and presses the select button on the controller 7 three times (causing a shift from "M" to "N" and to "O"), "O" is displayed, as an undetermined character, following the determined character "H" in the input character display area as shown in FIG. 18C. Then, before inputting the next character "N" in the string "HONEY", the user needs to turn the undetermined character "O" into a determined character. With conventional methods, the user needs to press a determination button in order to turn the undetermined character "O" into a determined character. Here, in contrast, this can be done by moving the position pointed at by the controller 7 out of the "MNO" key (i.e., by only by slightly moving the pointer) as shown in FIG. 18D.

Figure 18E:
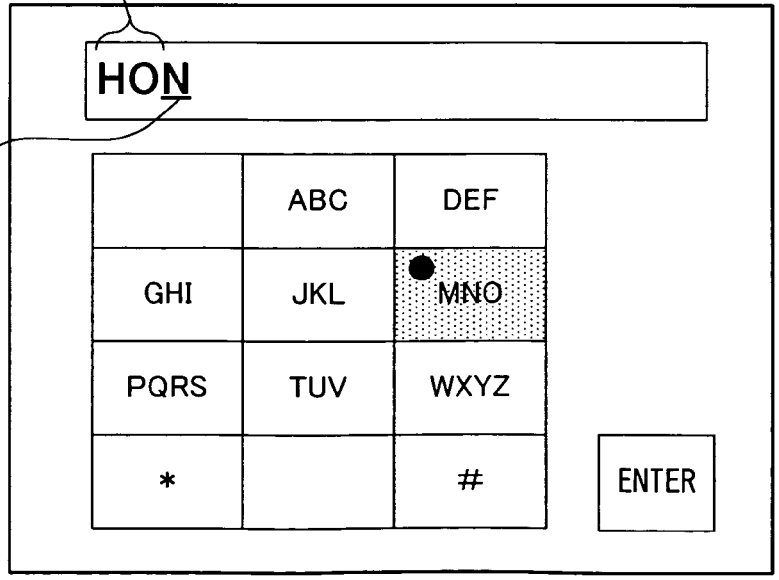
FIG. 18E shows an exemplary screen of the monitor 2 during a character input operation.

After confirming that "O" has turned into a determined character, the user moves the position pointed at by the controller 7 back onto the "MNO" key and presses the select button on the controller 7 twice (causing a shift from "M" to "N"), whereby an undetermined character "N" is displayed following the determined character string "HO" as shown in FIG. 18E.

Figures 18F, 19:
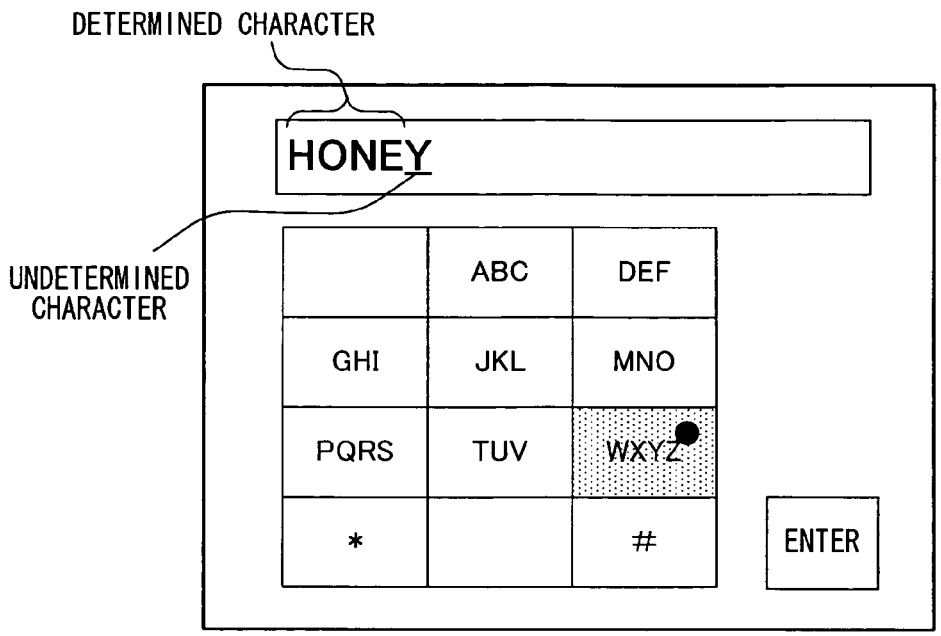
FIG. 18F shows an exemplary screen of the monitor 2 during a character input operation.
FIG. 19 shows a specific example of the character assignment information 53.

Then, the user moves the pointer onto the "DEF" key, presses the select button on the controller 7 twice (causing a shift from "D" to "E"), moves the pointer onto the "WXYZ" key, and presses the select button on the controller 7 three times (causing a shift from "W" to "X" and to "Y"), whereby the character string "HONEY" is displayed in the input character display area as shown in FIG. 18F. Then, the user moves the pointer onto the enter key image and presses the select button on the controller 7 to thereby register the character string "HONEY" displayed in the input character display area as the character name.

FIG. 19 shows a specific example of the character assignment information 53 provided for realizing a character input process as described above.

When an undetermined character in the input character area turns into a determined character, the user may be notified of the change by means of a sound, an animation, or a vibration of the controller 7, as in the case where the user inputs Japanese characters. Then, a new user can intuitively learn the character input method of the present invention, where an undetermined character is turned into a determined character when the pointed position moves out of the character input key image associated with the undetermined character. The user can know that an undetermined character has turned into a determined character even without looking at the determined character string, thus improving the controllability.

An undetermined character may be displayed at any position as in the case where the user inputs Japanese characters. For example, one of the group of characters on the character input key image being pointed at by the controller 7 may be highlighted as an undetermined character as shown in FIG.

Figure 20A:
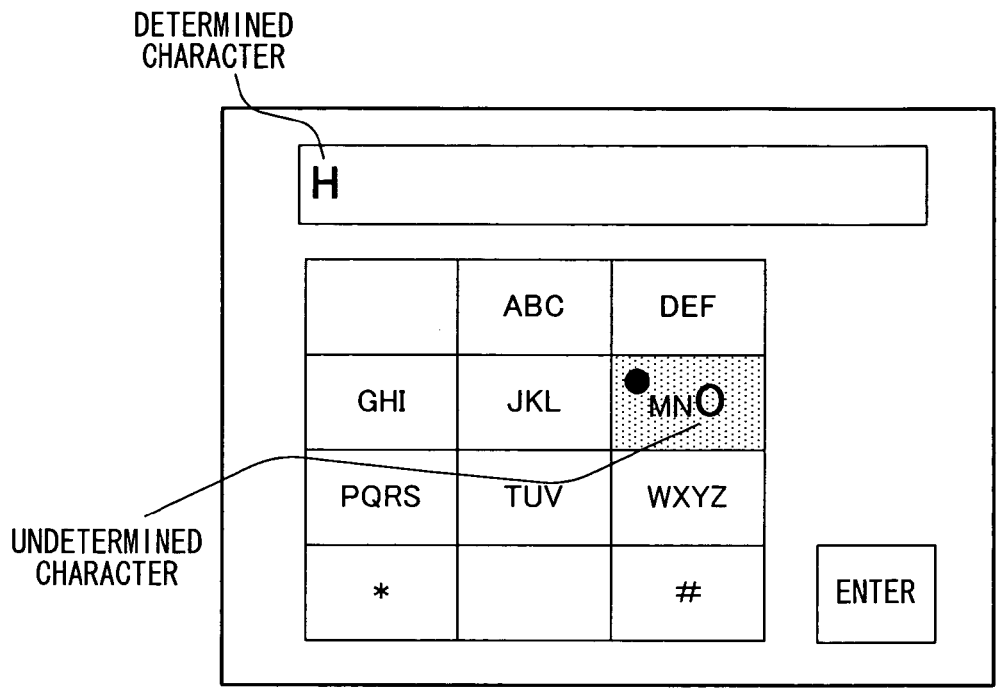
FIG. 20A shows an exemplary screen of the monitor 2 during a character input operation.
Figure 20B:
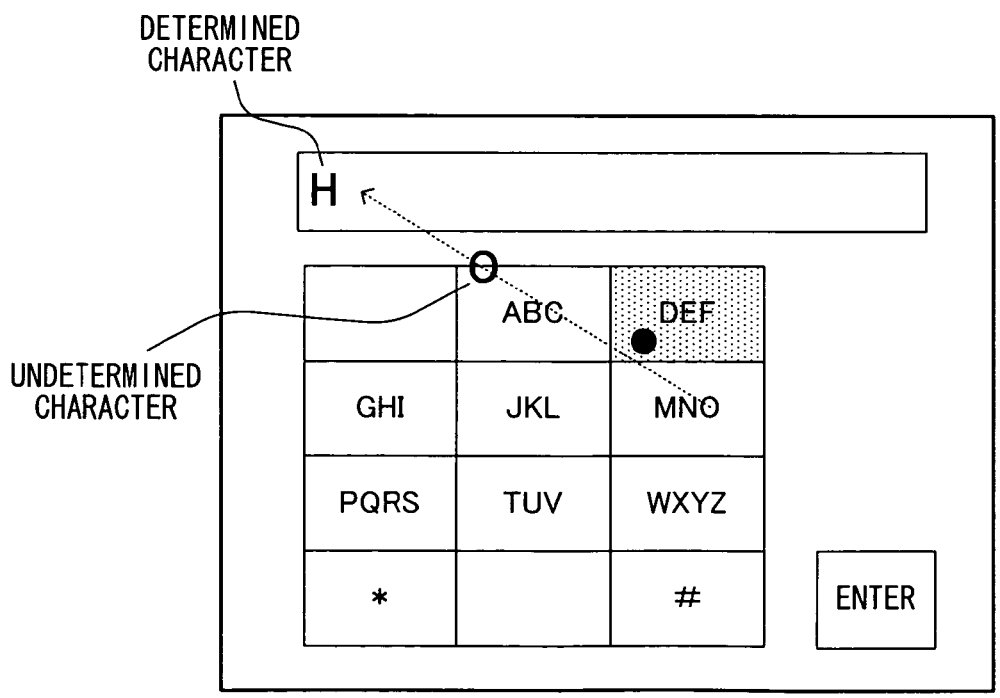
FIG. 20B shows an exemplary screen of the monitor 2 during a character input operation.

20A. FIG. 20A shows a case where the select button on the controller 7 has been pressed three times while the pointer is on the "MNO" key. Then, the undetermined character is displayed near the pointed position, whereby the user no longer needs to move the eyes substantially away from the pointed position in order to check the undetermined character, thus improving the controllability. An undetermined character can be highlighted by, for example, changing at least one of the size, color, shape and position of the character. In this case, when an undetermined character turns into a determined character, there may be provided an animation to show the undetermined character moving out of the character input key image to a position following the determined character string as shown in FIG. 20B. Then, it is possible to naturally guide the user's eyes away from the character input key image and into the input character display area, whereby the user can reliably be notified of the change from an undetermined character to a determined character. Moreover, a new user can intuitively learn the character input method of the present invention, where an undetermined character is turned into a determined character when the pointed position moves out of the character input key image associated with the undetermined character.

Alternatively, the undetermined character may be displayed near the position pointed at by the controller 7 (i.e., the pointer position) so that the undetermined character moves together with the pointed position as shown in FIG. 21. Thus, the undetermined character is displayed near the pointed position, whereby the user no longer needs to move the eyes substantially away from the pointed position in order to check the undetermined character, thus improving the controllability.

Alternatively, the user may be notified of the undetermined character being displayed on the screen via a sound outputted from the speaker 22. For example, the sound of "P" may be outputted from the speaker when the undetermined character "P" is displayed on the screen, and the sound of "Q" may be outputted from the speaker when the undetermined character is changed from "P" to "Q". Thus, the user can audibly check the undetermined character, whereby the user no longer needs to move the eyes substantially away from the pointed position in order to check the undetermined character, thus improving the controllability.

While the non-limiting illustrative embodiments have been described in detail, the foregoing description is in all aspects illustrative and not restrictive. It is understood that numerous other modifications and variations can be devised without departing from the scope of the invention. The invention is intended to be defined by the claims and to cover all corresponding and equivalent arrangements whether or not specifically disclosed herein, without departing from the scope of the invention.

What is claimed is:

1. A non-transitory computer-readable storage medium storing computer-readable instructions for inputting characters by using a pointing device having at least one button and capable of pointing at a set of coordinates on a screen of a display device, the stored computer-readable instructions configured to:
    display a character input key image associated with a group of characters on the screen;
    detect the set of coordinates on the screen being pointed at by the pointing device based on a signal from the pointing device;
    detect whether or not the at least one button is operated;
    display a character on the screen as an undetermined character in a cyclic order from among the group of characters associated with the character input key image each time the at least one button is operated while the set of coordinates on the screen being pointed at by the pointing device is detected to be within the displayed character input key image;
    determine whether or not the detected set of coordinates is within an area other than the displayed character input key image associated with the displayed character that is the undetermined character; and
    display the undetermined character as a determined character on the screen in accordance with the determination that the set of coordinates pointed at by the pointing device is within an area other than the character input key image associated with the undetermined character displayed on the screen,
    wherein the determination of whether or not the detected set of coordinates is within an area other than the displayed character input key image is done with reference to the detected set of coordinates and character input key image layout information representing a display position of the character input key image on the screen.

2. The non-transitory computer-readable storage medium according to claim 1, wherein the character input key image comprises a plurality of character input key images.

3. The non-transitory computer-readable storage medium according to claim 1, wherein the display of the undetermined character is at a position following a determined character string displayed on the screen.

4. The non-transitory computer-readable storage medium according to claim 1, wherein the undetermined character is displayed on the screen on the character input key image being pointed at by the pointing device.

5. The non-transitory computer-readable storage medium according to claim 1, wherein:
    the group of characters associated with the character input key image are displayed on the character input key image; and
    the undetermined character being pointed at by the pointing device is highlighted.

6. The non-transitory computer-readable storage medium according to claim 1, wherein the display of the undetermined character is near the set of coordinates pointed at by the pointing device so that the undetermined character moves together with the set of coordinates pointed at by the pointing device.

7. The non-transitory computer-readable storage medium according to claim 1, wherein the stored computer-readable instructions are further configured to notify a user of an undetermined character being displayed on the screen via a sound output.

8. The non-transitory computer-readable storage medium according to claim 1, wherein the stored computer-readable instructions are further configured to notify a user that the undetermined character displayed on the screen has turned into a determined character after the set of coordinates pointed at by the pointing device moves out of the character input key image associated with the undetermined character being displayed on the screen.

9. The non-transitory computer-readable storage medium according to claim 8, wherein the stored computer-readable instructions are further configured to provide an animation of the undetermined character moving to a position following a determined character string being displayed on the screen.

10. The non-transitory computer-readable storage medium according to claim 8, wherein the stored computer-readable instructions are further configured to play a predetermined sound effect when the set of coordinates pointed at by the pointing device moves out of the character input key image associated with the undetermined character being displayed on the screen.

11. The non-transitory computer-readable storage medium according to claim 1, wherein each character input key image is assigned a group of kana characters from one column in a Japanese syllabary.

12. The non-transitory computer-readable storage medium according to claim 1, wherein each character input key image is assigned a group of English alphabet characters.

13. The non-transitory computer-readable storage medium according to claim 1, wherein each character input key image is assigned a group of words.

14. The non-transitory computer-readable storage medium according to claim 1, wherein each character input key image is assigned a group of symbols.

15. The medium of claim 1, wherein the display of the undetermined character as the determined character further includes selection of the determined character.

16. A character input device, comprising:
at least two markers provided in association with a screen of a display device;
a pointing device including:
an image sensing device for capturing an image of the markers;
a control button;
a processing system that includes at least one processor, the processing system configured to:
calculate a coordinate position on the screen based on a positional relationship of the markers with respect to the captured image obtained from the image sensing device, the coordinate position including a set of coordinates;
display a character input key image associated with a group of characters on the display device;
detect whether or not the control button is operated;
display one character on the screen as an undetermined character in a cyclic order from among the group of characters associated with the character input key image, which is being overlapped by the coordinate position, each time the operation of the control button is detected while the coordinate position is overlapping the character input key image; and
select the one character as a determined character in response to when the coordinate position moves out of the character input key image associated with the undetermined character,
wherein a determination of whether or not the set of coordinates is within an area other than the displayed character input key image is done with reference to the set of coordinates and character input key image layout information representing a display position of the character input key image on the display device.

17. The device of claim 16, wherein the character input key image comprises a plurality of character input key images.

18. The device of claim 16, wherein the display of the undetermined character is at a position following a determined character string displayed on the screen.

19. The device of claim 16, wherein the undetermined character is displayed on the screen on the character input key image being pointed at by the pointing device.

20. The device of claim 16, wherein:
the group of characters associated with the character input key image are displayed on the character input key image; and
the undetermined character being pointed at by the pointing device is highlighted.

21. The device of claim 16, wherein the display of the undetermined character is near the set of coordinates pointed at by the pointing device so that the undetermined character moves together with the set of coordinates pointed at by the pointing device.

22. The device of claim 16, wherein the stored computer-readable instructions are further configured to notify a user of an undetermined character being displayed on the screen via sound output.

23. The device of claim 16, wherein the processing system is further configured to notify a user that the undetermined character displayed on the screen has turned into a determined character after the set of coordinates pointed at by the pointing device moves out of the character input key image associated with the undetermined character being displayed on the screen.

24. The device of claim 23, wherein the processing system is further configured to provide an animation of the undetermined character moving to a position following a determined character string being displayed on the screen.

25. The device of claim 23, wherein the processing system is further configured to play a predetermined sound effect when the set of coordinates pointed at by the pointing device moves out of the character input key image associated with the undetermined character being displayed on the screen.

26. The device of claim 16, wherein each character input key image is assigned a group of kana characters from one column in a Japanese syllabary.

27. The device of claim 16, wherein each character input key image is assigned a group of English alphabet characters.

28. The device of claim 16, wherein each character input key image is assigned a group of words.

29. The device of claim 16, wherein each character input key image is assigned a group of symbols.

30. A non-transitory computer-readable storage medium, storing a character input program for a computer of an information processing device having a function of calculating a set of coordinates on a screen of a display device being pointed at by a pointing device, the pointing device including an image sensing device for capturing an image of at least two markers provided around the screen of the display device and a control button, and the calculation being carried out based on information representing a positional relationship of the markers with respect to the captured image received from the pointing device, the character input program configured to:
display a character input key image associated with a group of characters on the screen of the display device;
detect whether or not the button is operated;
display a character on the screen as an undetermined character in a cyclic order from among the group of characters associated with the character input key image, which is being overlapped by the set of coordinates pointed at by the pointing device, each time the operation of the button is detected while the set of coordinates pointed at by the pointing device is overlapping the character input key image; and
select the undetermined character as a determined character in response to a determination that the set of coordinates is no longer in an area of the character input key image associated with the undetermined character,
wherein the determination that the set of coordinates is no longer in an area other than the area of the character input key image associated with the undetermined character is done with reference to the set of coordinates and character input key image layout information representing a display position of the character input key image on the screen.

31. The non-transitory computer-readable storage medium according to claim 30, wherein the character input key image includes a plurality of character input key images.

32. The non-transitory computer-readable storage medium according to claim 30, wherein the undetermined character is displayed at a position following a determined character string being displayed on the screen.

33. The non-transitory computer-readable storage medium according to claim 30, wherein the undetermined character is displayed on the character input key image being pointed at by the pointing device.

34. The non-transitory computer-readable storage medium according to claim 30, wherein:
- the group of characters associated with the character input key image are displayed on the character input key image; and
- the undetermined character is highlighted from the group of characters on the character input key image being pointed at by the pointing device when the undetermined character is displayed.

35. The non-transitory computer-readable storage medium according to claim 30, wherein the character input program is further configured to notify a user that the undetermined character displayed on the screen has turned into a determined character after the set of coordinates pointed at by the pointing device moves out of the character input key image associated with the undetermined character being displayed on the screen.

36. A character input system for inputting characters into a processing system that includes at least one processor by using a pointing device that includes at least one button and is capable of pointing at a set of coordinates on a surface of a display, wherein the processing system is configured to:
- display a character input key image associated with a group of characters on the screen;
- detect the set of coordinates on the screen being pointed at by the pointing device based on a signal from the pointing device;
- detect an operation of the at least one button;
- display a character on the screen as an undetermined character from among the group of characters when an operation is detected and the set of coordinates is within the displayed character input key image; and
- set the displayed character on the screen as a determined character based on a movement of the detected set of coordinates no longer being within an area associated with the displayed character input key image, wherein a determination of whether or not the detected set of coordinates is within an area other than the displayed character input key image is done with reference to the detected set of coordinates and character input key image layout information representing a display position of the character input key image on the screen.

37. A method of inputting characters into a computing system having at least one processor, the method comprising:
- displaying a character input key image associated with a group of characters on a display screen;
- detecting a set of coordinates on the screen being pointed at by a user input device based on a signal sent from the user input device, the user input device including at least one button;
- detecting an operation of the at least one button of the user input device;
- displaying an undetermined character on the display screen from among the group of characters when the operation is detected and the set of coordinates is within the displayed character input key image; and
- defining the displayed undetermined character as a determined character in accordance with determining that the set of coordinates is no longer within the displayed character input key image, wherein a determination of whether or not the detected set of coordinates is within an area other than the displayed character input key image is done with reference to the detected set of coordinates and character input key image layout information representing a display position of the character input key image on the display screen.

* * * * *